United States Patent
Turner et al.

(10) Patent No.: US 6,865,656 B2
(45) Date of Patent: Mar. 8, 2005

(54) METHOD AND SYSTEM FOR EFFICIENT TRANSFER OF DATA BETWEEN CUSTOM APPLICATION SPECIFIC INTEGRATED CIRCUIT HARDWARE AND AN EMBEDDED MICROPROCESSOR

(75) Inventors: Simon Turner, San Diego, CA (US); Scott King, Poway, CA (US); Jian Lin, San Diego, CA (US); Kerry Taylor, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 285 days.

(21) Appl. No.: 09/950,742

(22) Filed: Sep. 10, 2001

(65) Prior Publication Data

US 2003/0051115 A1 Mar. 13, 2003

(51) Int. Cl.[7] .............................................. G06F 12/00
(52) U.S. Cl. ..................... 711/165; 711/100; 711/101; 711/104; 711/154; 709/216
(58) Field of Search .............................. 711/165, 154, 711/100, 101, 104; 709/216

(56) References Cited

U.S. PATENT DOCUMENTS

| | | | |
|---|---|---|---|
| 5,940,404 A | | 8/1999 | Delp et al. .................. 370/465 |
| 6,073,210 A | * | 6/2000 | Palanca et al. ............. 711/118 |
| 6,134,609 A | | 10/2000 | Klein .......................... 710/52 |
| 6,223,236 B1 | | 4/2001 | Kori ........................... 710/120 |
| 6,268,973 B1 | * | 7/2001 | Bickers ....................... 360/48 |
| 6,378,007 B1 | * | 4/2002 | Southwell ..................... 710/1 |
| 6,466,581 B1 | * | 10/2002 | Yee et al. ................... 370/428 |
| 6,567,902 B1 | * | 5/2003 | Padmanabhan et al. ..... 711/165 |
| 6,625,472 B1 | * | 9/2003 | Farazmandnia et al. .... 455/557 |

* cited by examiner

*Primary Examiner*—Stephen Elmore
(74) *Attorney, Agent, or Firm*—Philip Wadsworth; Charles D. Brown; Howard H. Seo

(57) ABSTRACT

A method and system for transferring data bytes includes a first memory adapted to store a plurality of multiple-byte data words including header field bytes and one or more data field bytes. The system also includes a second memory adapted to store data field bytes transferred thereto from the first memory. A controller coupled to the first and second memories reads a data word including the header field byte and the one or more data field bytes out of the first memory. The system also includes a data packer coupled to the controller and the second memory. The controller and data packer cooperate to transfer the one or more data field bytes of the first data word read from the first memory to the second memory. The data packer stores only the one or more data field bytes in the second memory contiguously with a previously transferred and stored data field byte.

26 Claims, 12 Drawing Sheets

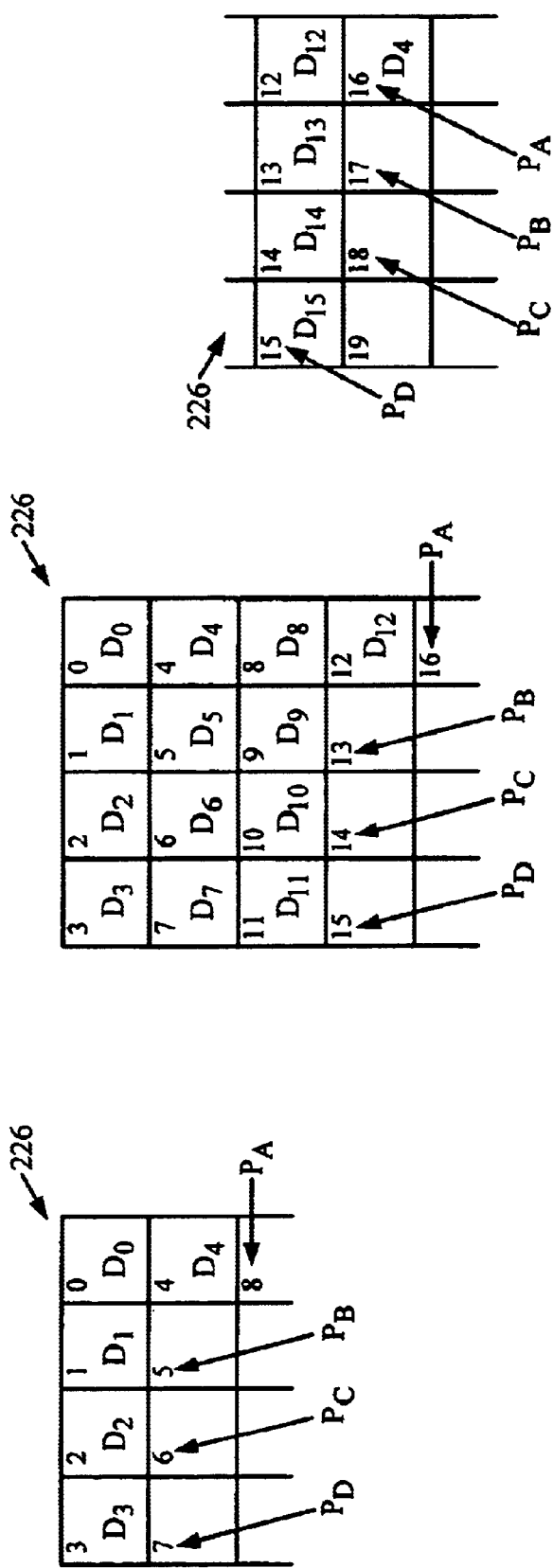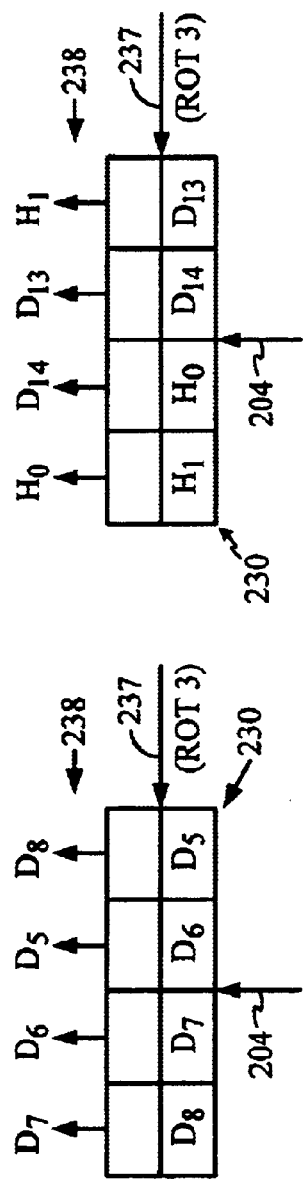
FIG. 8E
FIG. 8D
FIG. 8C

METHOD AND SYSTEM FOR EFFICIENT TRANSFER OF DATA BETWEEN CUSTOM APPLICATION SPECIFIC INTEGRATED CIRCUIT HARDWARE AND AN EMBEDDED MICROPROCESSOR

BACKGROUND OF THE INVENTION

1. Field of the Invention

The present invention relates generally to data transfer techniques, and more particularly, to such a data transfer technique implemented in a wireless communication device.

2. Background Art

A wireless communication device (WCD) typically includes a modulator-demodulator section (commonly referred to as a "modem") to modulate signals to be transmitted and demodulate incoming or received signals. A known modem, such as a cellular modem, demodulates incoming or received signals received over one or more external interfaces to produce demodulated data. Then, the modem transfers the demodulated data to a destination device over one or more additional external interfaces.

As received signal data rates increase, the number of transfer operations per unit time required to transfer demodulated data to the one or more additional external interfaces in a timely manner correspondingly increases. Accordingly, data transfer operation efficiency becomes an increasingly important factor in modem design as the received signal data rates increase.

A modem typically includes a modem controller to control operation of the modem. A modern modem controller (such as a Reduced Instruction Set Computer (RISC) processor) is typically capable of transferring data in units of multiple-byte words using multiple-byte transfer operations, such as multiple-byte read and write operations. For example, the modem controller can transfer a multiple-byte data word from a memory to an external interface using multiple-byte read and write operations. However, the modem controller may require the multiple-byte data word to be stored in the memory such that the source address of the data word is aligned with a word address boundary of the memory. In some instances, data bytes to be transferred may not be aligned with the word address boundary, as required. Therefore, there is a need for a mechanism enabling a modem controller to transfer such non-aligned data bytes using multiple-byte read and write operations.

The RISC processor and the memory mentioned above are typically coupled together using a memory bus. A maximum rate at which the memory bus can accommodate data transfers between the memory and the RISC processor, and between any other components similarly coupled to the memory bus (such as the one or more additional external interfaces), is referred to as the memory bus bandwidth. Typically, the RISC processor can utilize substantially all of the memory bus bandwidth. Because of such high RISC processor utilization of the memory bus bandwidth, Direct Memory Access (DMA) techniques for transferring data are undesirable, because such DMA transfers operate by way of "stealing" memory bus bandwidth from the processor (that is, by stealing memory bus read or write transfer cycles), thus reducing RISC processor utilization efficiency.

Therefore, there is a need to implement efficient data transfers using a modem controller so as to avoid the complexities of DMA transfers, such as memory bus cycle stealing, thereby minimizing the total number of memory bus cycles required to effect the data transfers.

BRIEF SUMMARY OF THE INVENTION

Summary

The present invention provides a method and system for efficiently transferring data bytes in a WCD. The WCD includes a modem for demodulating (and decoding) a received signal to produce demodulated (and decoded) data bytes. A modem controller (for example, a RISC microprocessor) effects a highly efficient transfer of the demodulated data bytes to an external interface.

The modem includes the modem controller, a first buffer, an intermediate memory, and a data packer coupled together by a memory bus. A second buffer is coupled to the data packer. The modem controller first transfers demodulated data from the first buffer to the intermediate memory using multiple-byte read and write operations. The modem controller then transfers the demodulated data from the intermediate memory to the second buffer over the memory bus using multiple-byte read and write operations. The modem controller transfers the demodulated data from the intermediate memory to the second buffer through a portion of a transmit hardware interface referred to as the data packer (mentioned briefly above). The data packer accepts data words transferred thereto, each in the form of a multiple-byte data word, and preserves a correct byte ordering of data bytes in each of the multiple-byte data words. Therefore, the present invention preserves the byte order of received data bytes. The data packer also pipelines data transfers so one multiple-byte data word can be transferred from the intermediate memory to the second buffer and stored in the second buffer during each memory bus cycle of the memory bus.

An advantageous feature of the present invention is to allow the modem controller to use efficient multiple-byte data word transfers to transfer data from the intermediate memory that may not begin or end on a required data word address boundary of the intermediate memory. To support this feature, the data packer can be programmed to ignore undesired data bytes (also referred to as "non-data" bytes) that may be included in a first multiple-byte data word and a last multiple-byte data word of a multiple data word data transfer to the second buffer. This is accomplished by programming the data packer with a byte offset of a first data byte and a total number of data bytes to be transferred from the intermediate memory, before transferring the data bytes from the intermediate memory to the second buffer. By pipelining data transfers, transferring data in multiple-byte words with the correct byte ordering, and supporting multiple-byte word transfers for data beginning and ending at any address in the intermediate memory, the number of memory bus cycles required for data transfers from modem memory to the external interface is minimized.

According to the present invention, a system for transferring data includes a first memory adapted to store a plurality of multiple-byte data words including header field bytes and one or more data field bytes. The header field bytes are considered undesired or non-data bytes. The system also includes a second memory adapted to store data field bytes from the first memory. The system includes a controller coupled to the first and second memories and adapted to read a data word including the header field bytes and the one or more data field bytes out of the first memory. The system also includes a data packer coupled to the controller and the second memory. The controller and data packer act together to transfer the one or more data field bytes of the first data word read from the first memory to the second memory. The data packer stores only the one or more data field bytes in the second memory contiguously with a previously transferred and stored data field byte.

Features and Advantages

A feature of the present invention is to efficiently transfer data in a modem using a modem controller. The present invention advantageously minimizes the total number of memory bus cycles required to effect the data transfers by avoiding, for example, complex and inefficient DMA transfer techniques.

Another feature of the present invention is to transfer data bytes while preserving a correct byte order of the data bytes so transferred.

Another feature of the present invention is to transfer data bytes using efficient multiple-byte data word reads from and writes to memory. A related advantage of the present invention is that such multiple-byte word reads and writes are performed even when the data bytes are not aligned with word address boundaries in the memory.

BRIEF DESCRIPTION OF THE DRAWINGS/FIGURES

The foregoing and other features and advantages of the invention will be apparent from the following, more particular description of a preferred embodiment of the invention, as illustrated in the accompanying drawings.

FIG. 5A is an example signal including header and data fields received by a WCD of the present invention FIG. 5B is an illustration of an example arrangement and example contents of a first memory after the header and data field bytes of the signal of FIG. 5A have been stored therein.

FIG. 5C is a diagram of an example memory arrangement and contents of a second receive path buffer of FIG. 2 after first and second data field blocks have been transferred from the first memory of FIG. 5B to the second receive path buffer using the present invention.

Figure 4:
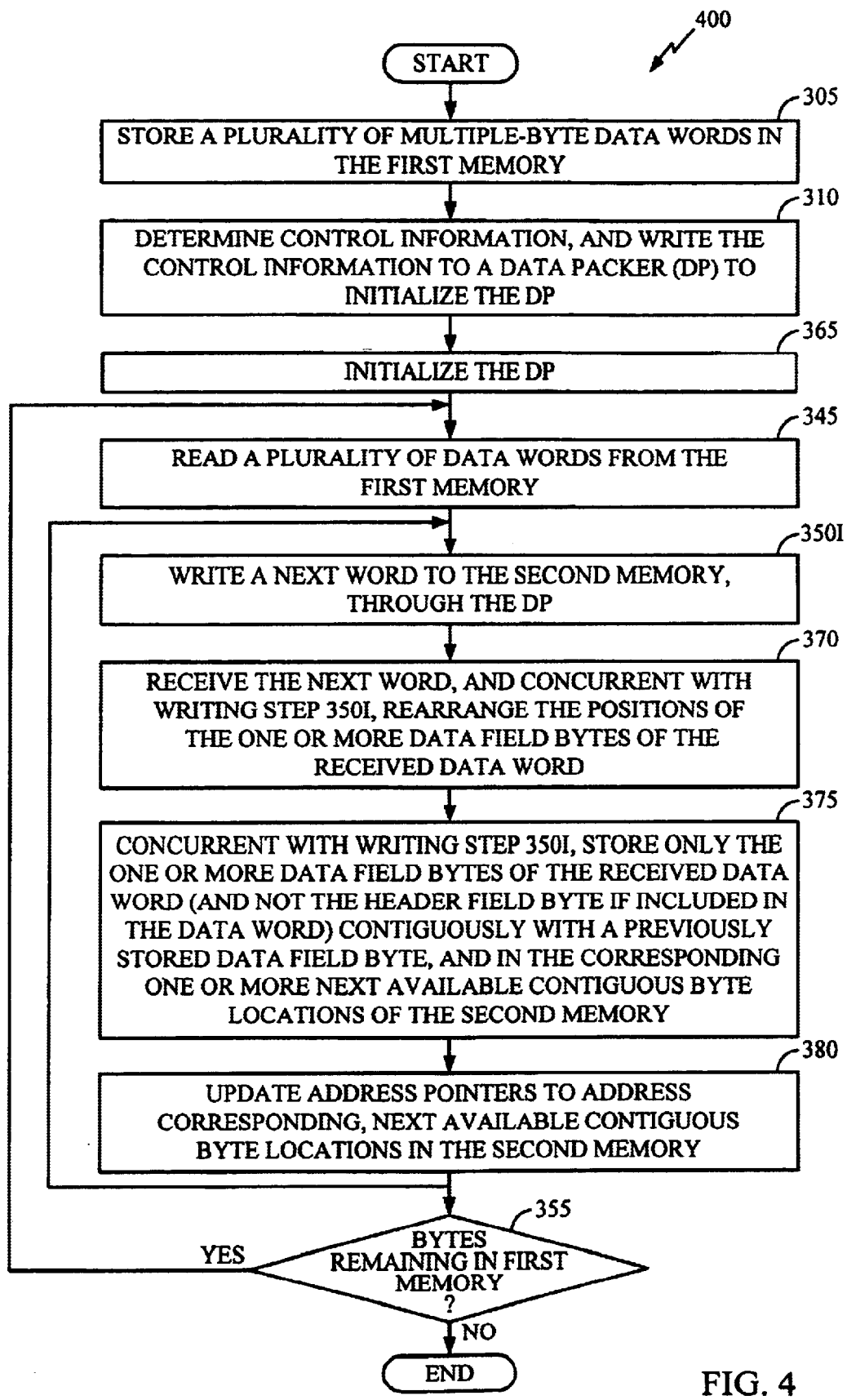
FIG. 4 is a flow chart of an example overall method of transferring a block of data field bytes from a first memory to a second memory using a modem controller and a data packer of FIG. 2.
Figure 8B:
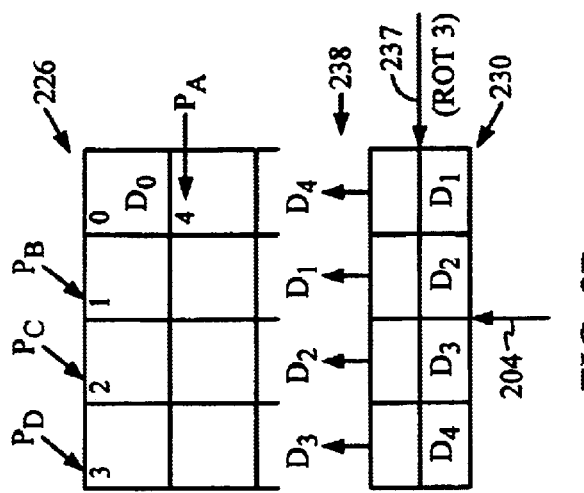
FIG. 8A is an illustration of an example portion of a second receive path buffer of FIG. 2 and example portions of a data packer of FIG. 2, at different stages of an exemplary data transfer implemented using the example overall method of FIG. 4.
Figure 8A:
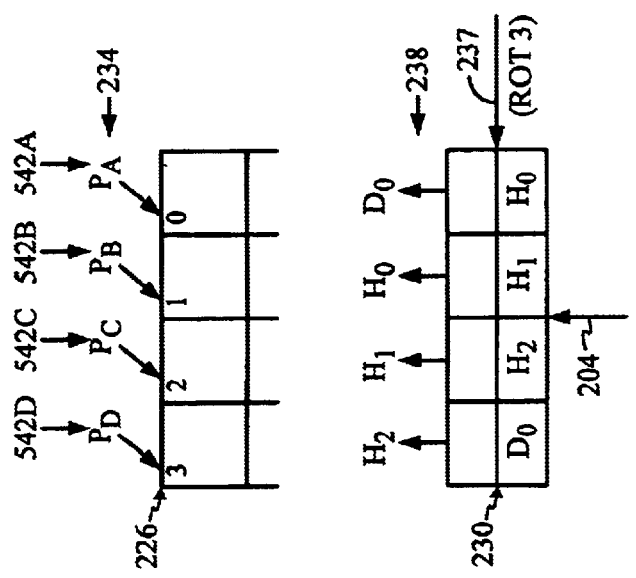

FIGS. 8B, 8C, 8D, and 8E are similar to FIG. 8A, except each of the FIGS. 8B–8E corresponds to a different stage of the exemplary data transfer implemented using the example overall method of FIG. 4.

Figure 2:
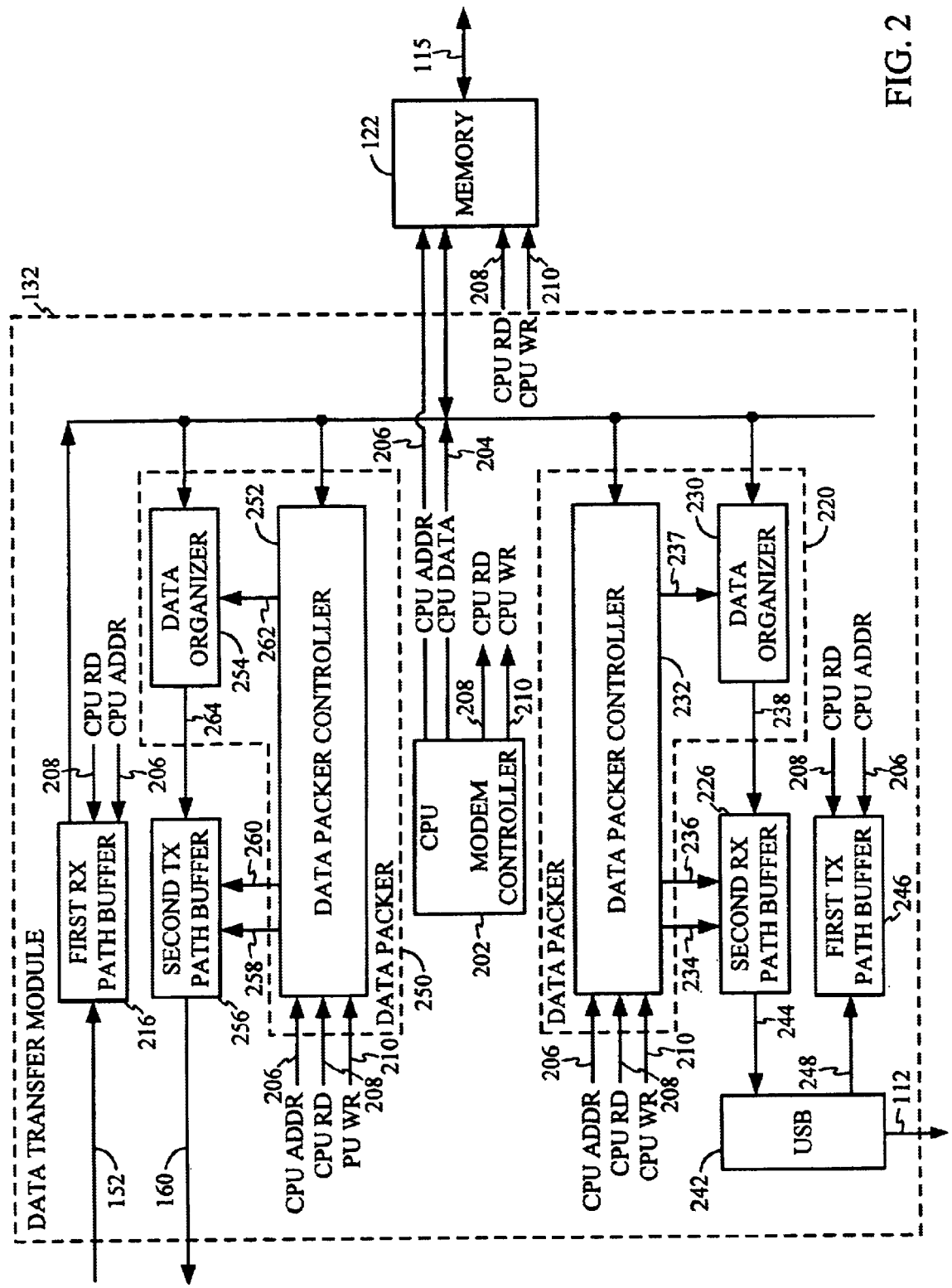
FIG. 2 is a block diagram of an example data transfer module of FIG. 1.
Figure 9:
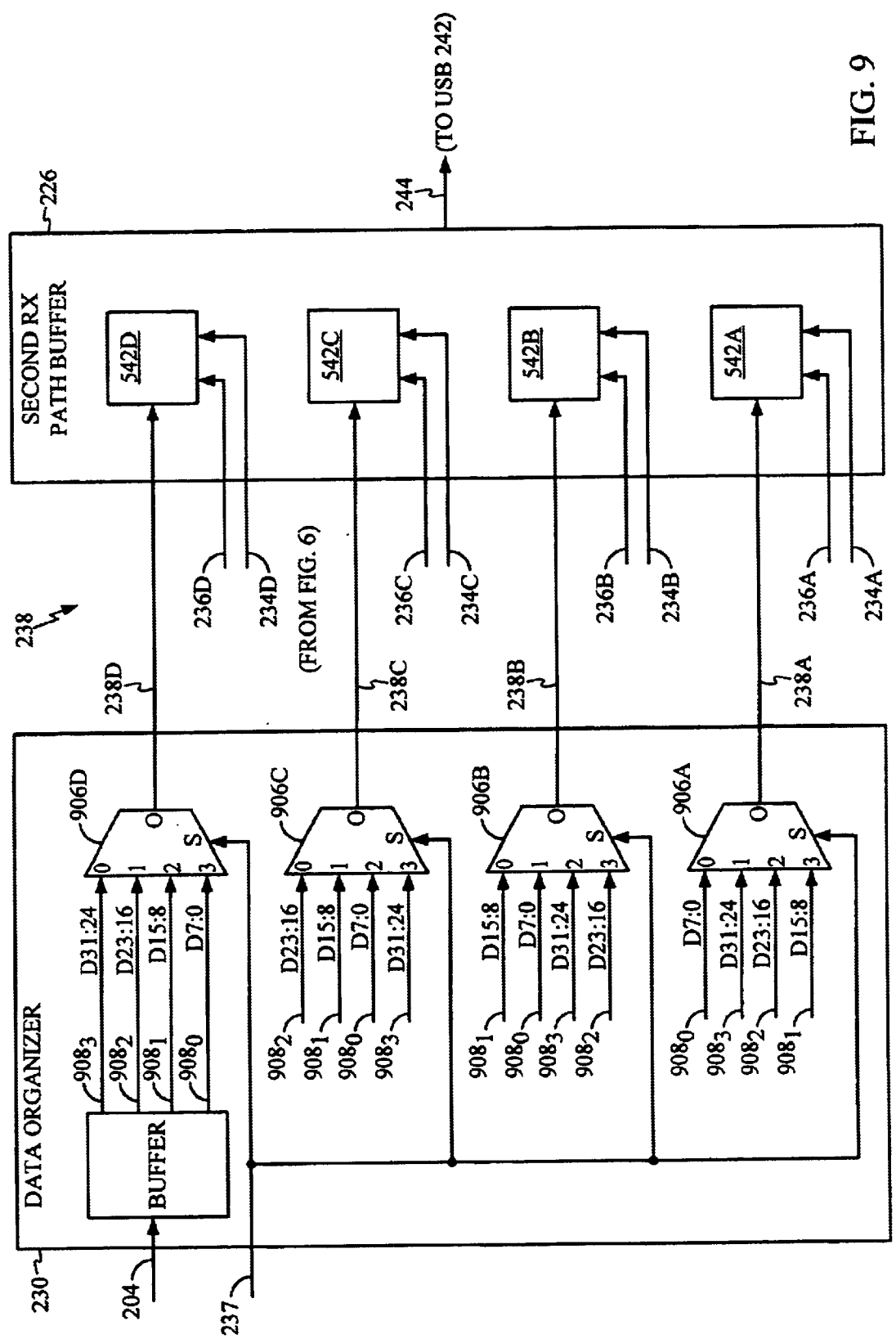

FIG. 9 is a detailed block diagram of a Data Organizer portion of a Data Packer of FIG. 2.

Figure 10:
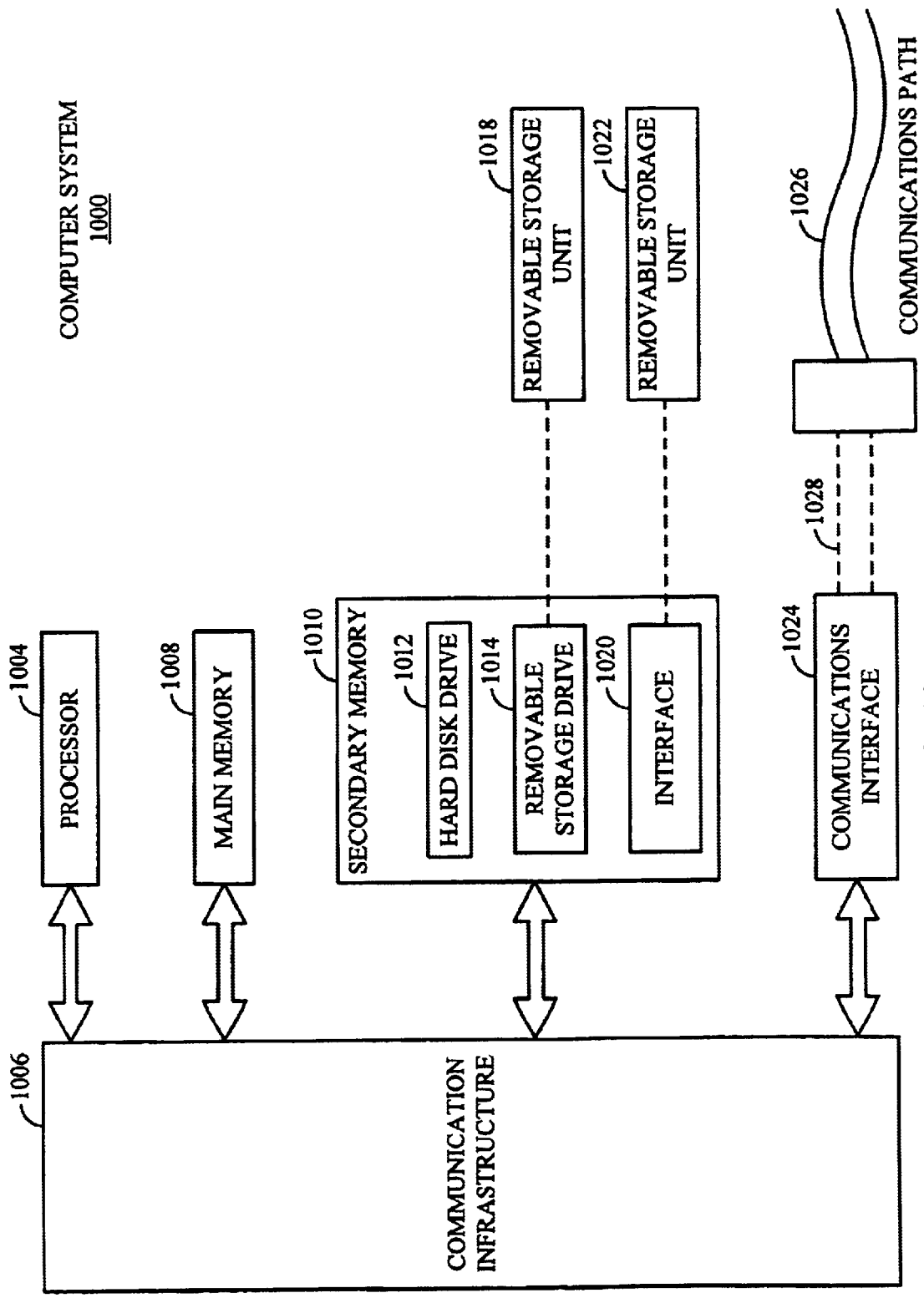

FIG. 10 is a block diagram of an exemplary computer system on which the present invention can be implemented.

DETAILED DESCRIPTION OF THE INVENTION

Operating Environment

Figure 1:
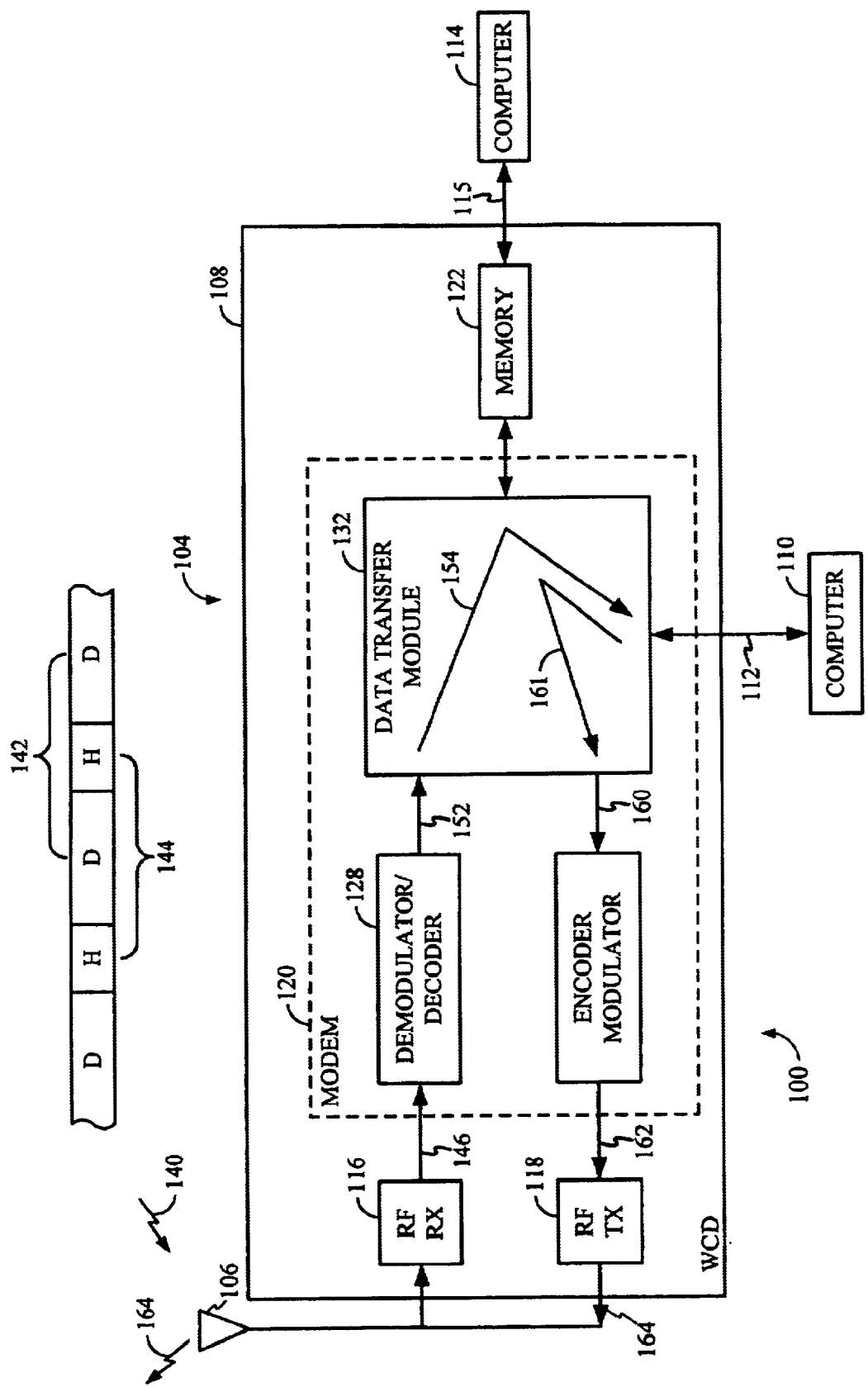
FIG. 1 is a block diagram of an example system in which the present invention can be implemented.

FIG. 1 is a block diagram of an example system 100 in which the present invention can be implemented. System 100 includes a WCD 104 including a transmit/receive antenna 106 and a signal processing module 108 coupled to antenna 106. System 100 further includes a computer 110 coupled to signal processing module 108 by a datalink 112, such as a serial datalink, for example.

System 100 also includes an optional computer 114 coupled to signal processing module 108 by a datalink 115.

Signal processing module 108 includes a Radio Frequency (RF) receive section 116, an RF transmit section 118, a modem 120, and a memory 122 (referred to as an "intermediate" memory, above). Modem 120 includes a demodulator/decoder section 128 coupled to RF receive section 116 and an encoder/modulator section 130 coupled to RF transmit section 118. Modem 120 also includes a Data Transfer Module 132, constructed and operated in accordance with the principles of the present invention, coupled to demodulator/decoder and modulator/encoder sections 128 and 130, memory 122, and computer 110.

In operation and in a receive direction, antenna 106 of WCD 104 receives an RF signal 140 transmitted from another wireless communication device (not shown), such as a base station, mobile device, and so on. RF signal 140 can comply with any number of communication protocols including, for example, a Code Division Multiple Access (CDMA) High Data Rate (HDR) communication protocol such as cdma2000 1×EV-DO (Evolution-Data Only). In accordance with cdma2000 1×EV-DO, RF signal 140 can carry information at data rates in excess of 2.4 Mega-bits-per-second (Mbps). In addition, RF signal 140 can carry information formatted in accordance with a data protocol, such as TCP/IP (Transaction Control Protocol/Internet Protocol). RF signal 140 may comply with other communication and data protocols in the present invention. The information carried by RF signal 140 can be formatted to include data fields 142 and header fields 144, in accordance with the relevant protocol.

Antenna 106 provides RF signal 140 to RF receive section 116. RF receive section 116 frequency down-converts the received RF signal, and provides a frequency down-converted signal 146, such as an Intermediate Frequency (IF) or a baseband signal, to demodulator/decoder 128 of modem 120. Demodulator/decoder 128 demodulates and then decodes down-converted signal 146 to produce a demodulated and decoded signal 152. Demodulated and decoded signal 152 can include, for example, time-ordered data bytes corresponding to data fields 142 (that is, data field bytes) and header fields 144 (that is, header field bytes) carried by RF signal 140.

Demodulator/decoder 128 provides demodulated and decoded signal 152 to data transfer module 132. In accordance with the present invention, data transfer module 132 stores both the header and data field bytes included in signal 152 in memory 122. Then, data transfer module 132 selectively transfers only the data field bytes from memory 122 to computer 110 over datalink 112. The data field bytes transferred from demodulator/decoder 128 to computer 110 traverse a receive data transfer path 154 (depicted as an arrow 154) in data transfer module 132. When received signal 140 conforms to cdma2000 1×EV-DO, data transfer module 132 transfers data from demodulator/decoder 128 to computer 110 at data rates in excess of 2.4 Mbps.

In a transmit direction, computer 110 provides data bytes (to be wirelessly transmitted to a remote device) to data transfer module 132 of modem 120 over datalink 112. Data transfer module 132 can format the data bytes received from computer 110 in accordance with a known protocol such as TCP/IP, to produce, for example, interspersed header field bytes and data field bytes (collectively referred to as data bytes). In accordance with the present invention, data transfer module 132 transfers the data bytes received from computer 110 (along with any added data bytes relating to a protocol such as TCP/IP) to encoder/modulator 130 (either directly, or via memory 122) in a signal 160. The data bytes transferred from computer 110 to encoder/modulator 130 traverse a transmit data transfer path 161 (depicted as an arrow 161) in data transfer module 132.

Encoder/modulator 130 encodes and then modulates the data bytes in signal 160, and provides an encoded and modulated baseband or IF signal 162 to RF transmit section 118. RF transmit section 118 frequency up-converts signal 162 to produce an RF transmit signal 164. RF transmit section 118 provides RF transmit signal 164 to antenna 106, to be wirelessly transmitted by the antenna.

FIG. 2 is a block diagram of data transfer module (DTM) 132, according to an embodiment of the present invention. Data transfer module 132 includes a modem controller 202 (also referred to as a Central Processing Unit (CPU)) coupled to a data bus 204 and an address bus 206 (collectively referred to as a memory bus). Modem controller 202 provides a read (RD) signal 208 and a write (WR) signal 210 to various other components in modem 120, described below.

Modem controller 202 is preferably a 32-bit controller (such as a 32-bit RISC processor), and correspondingly, address bus 206 and data bus 204 are preferably 32-bit address and data buses, respectively. However, for a 32-bit system, the address bus is not necessarily 32 bits. In an exemplary implementation of the present invention, controller 202 is an ARM7TDI RISC processor (referred to as an ARM RISC processor) manufactured by ARM Limited. Accordingly, modem controller 202 writes 32-bit words to and reads 32-bit words from the various other components coupled to data bus 204 and address bus 206. Such 32-bit words each include four data bytes, where each data byte includes 8 data bits. For example, modem controller 202 writes data to and reads data out of or from memory 122, which is also coupled to data and address buses 204 and 206. Modem controller 202 can access the various other components coupled to address and data buses 206 and 204 using a memory mapped access technique, an Input/Output (I/O) port access technique, or any other access techniques, as would be apparent to one of ordinary skill in the art.

It is convenient to describe the components of DTM 132 with reference to receive data transfer path 154 and transmit data transmit path 161, of DTM 132, mentioned above in connection with FIG. 1. Receive data transfer path 154 of DTM 132 includes a first receive path buffer 216 coupled to data and address buses 204 and 206 and to demodulator/ decoder 128. First buffer 216 stores data bytes including data field bytes and header field bytes provided thereto in signal 152. Receive data transfer path 154 also includes memory 122. Memory 122 can be a 32-bit Random Access Memory (RAM) capable of storing 32-bit data words at word addresses. Modem controller 202 accesses (that is, reads) the data bytes stored in first receive path buffer 216, and writes the data bytes including header field bytes and data field bytes to memory 122. Receive data transfer path 154 also includes a receive path Data Packer (DP) 220 coupled to data and address buses 204 and 206, and a second receive path buffer 226 (also referred to as a second buffer 226) coupled to DP 220. In the present invention, DP 220 and modem controller 202 cooperate to transfer data field bytes from memory 122 to second buffer 226, and then store the transferred data field bytes in the second buffer 226.

DP 220 includes a DP data organizer 230 coupled to data bus 204 and a DP controller 232 coupled to both data and address buses 204 and 206. DP controller 232 provides second buffer addresses to second buffer 226 over a second buffer address bus 234. DP controller 232 also provides second buffer write signals 236 to second buffer 226. DP controller 232 provides a DP data organizer control signal 237 to DP organizer 230.

DP data organizer 230 receives data bytes in units of 32-bit (that is, 4-byte) data words from data bus 204. DP data organizer 230 organizes the received data bytes to produce organized data bytes in accordance with control signal 237 from DP data controller 232. DP data organizer 230 provides the organized data bytes to second buffer 226 over a data bus 238. Data bus 238 is preferably a 32-bit (that is, 4-byte) data bus. DP controller 232 controls when and where the organized data bytes provided to second buffer 226 over data bus 238 are stored in the second buffer, using write signals 236 and the addresses provided over address bus 234, respectively.

Receive data transfer path 154 also includes a Universal Serial Bus (USB) module 242. Second buffer 226 provides data field bytes stored therein to USB module 242 over a data bus 244. In turn, USB module 242 provides the data field bytes to computer 110 (discussed above in connection with FIG. 1) over datalink 112. Therefore, USB 242, second buffer 226, and DP 220 form a hardware interface to external device or computer 110.

Modem Transmit Data Transfer Path

Transmit data transfer path 161 of DTM 132 also includes USB 242. Alternatively, a separate USB can be utilized for the transmit data path. In the transmit direction, USB 242 receives data bytes from computer 110 over datalink 112, and provides the data bytes to a first transmit path buffer 246 over a data bus 248. First transmit path buffer 246 is coupled to CPU data and address buses 204 and 206. In one embodiment, transmit data transfer path 161 further includes a transmit path DP 250, similar to DP 220 of receive path 154, coupled to data and address buses 204 and 206. DP 250 includes a DP controller 252 and a DP data organizer 254, similar to DP controller 232 and DP data organizer 230.

Transmit data transfer path 161 also includes a second transmit path buffer 256 coupled to DP 250. DP controller 252 provides buffer addresses to second transmit path buffer 256 over a buffer address bus 258. DP controller 252 also provides write signals 260 to second transmit path buffer 256. DP controller 252 also provides a control signal 262 to DP data organizer 254. DP data organizer 254 provides organized data bytes to transmit path second buffer 256 over a data bus 264. Second transmit path buffer 256 provides data bytes in data signal 160 to encoder/modulator 130, as mentioned above.

In another embodiment (not shown), DP 250 is omitted from transmit path 161. In this embodiment, data and address buses 204 and 206 are coupled directly to second transmit path buffer 256.

Example Methods

Modem controller 202 and DP 220 cooperate with one another to implement an overall method of transferring data bytes according to the present invention. Therefore, the overall method can be decomposed into method steps performed by modem controller 202 and separate method steps performed by DP 220, but in concert with the method steps performed by the modem controller. The separate method steps performed by each of modem controller 202 and DP 220 are now described, and then an overall method combining the separate method steps will be described.

First CPU Method

Figure 3A:
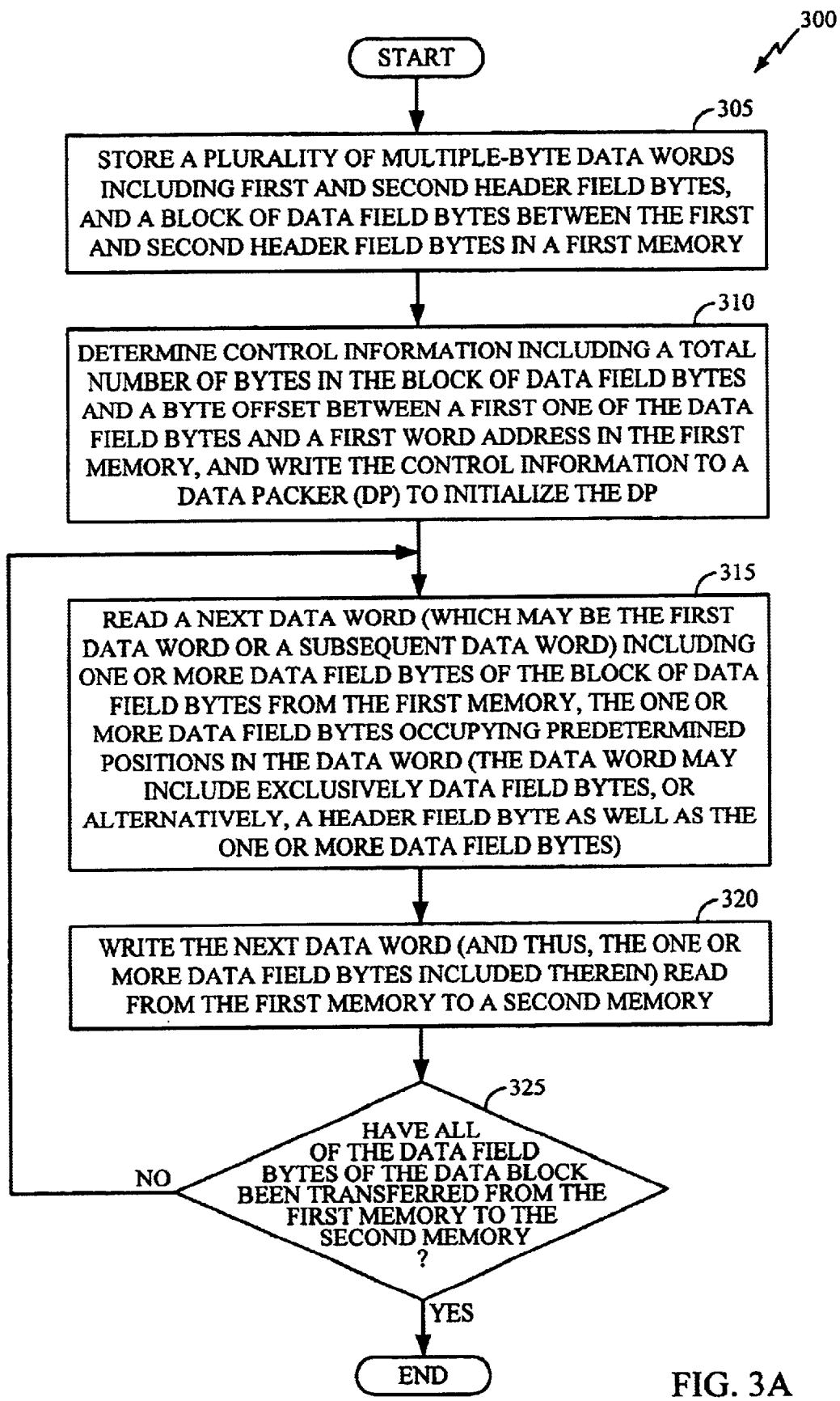
FIG. 3A is a flowchart of an example method of transferring data bytes implemented by a modem controller of FIG. 2 acting in concert with a data packer of FIG. 2.

FIG. 3A is a flowchart of an example method 300 of transferring data bytes according to the present invention. Method 300 includes a series of method steps performed by modem controller 202, as mentioned above. Method 300 is now described with reference to FIGS. 2 and 3A. In an initial step 305, modem controller 202 reads data bytes including header and data field bytes (corresponding to one or more of header and data fields 144 and 142 of signal 140, for example) stored in first receive path buffer 216. Modem controller 202 writes the data words read from first buffer 216 to memory 122 (referred to as "a first memory" in step 305 of the flow chart of FIG. 3A) using multiple byte data word (such as 32-bit or 4-byte data word, for example) write operations. After the write transfers, the data words stored in memory 122 can include, for example, data field bytes corresponding to data fields 142 and header field bytes corresponding to header fields 144 of signal 140, described above in connection with FIG. 1.

In step 305, modem controller 202 stores a plurality of multiple-byte data words including first and second header field bytes (for example, from consecutive ones of header fields 144) and a block of data field bytes (for example, from one of data fields 142) positioned between the first and second header field bytes in memory 122. A first one of the data words stored at a corresponding first word address of memory 122 includes a start or beginning data field byte of the block of data field bytes. The beginning data field byte may or may not be aligned with the first word address, that is, the data field byte may have a byte address that does not coincide with the first word address. Similarly, a last one of the data field bytes may or may not coincide with a data word address in memory 122.

In a next step 310, modem controller examines the above mentioned data bytes stored in memory 202 to determine where to route the data bytes. For purposes of the present invention, it is assumed certain ones of the data bytes (described below) are destined for USB 242, to be transferred from USB 242 to computer 110. However, it is to be understood that data bytes may be destined for other external interfaces, for example.

In step 310, modem controller 202 also examines the above mentioned data bytes stored in memory 122 to determine certain control information required to initialize DP 220 relative to a current block of data to be transferred to second buffer 226. Modem controller 202 then initializes DP 220 by writing such control information to DP controller 232. The control information includes a byte offset between the beginning data field byte and the first word address, mentioned above. The byte offset is also referred to herein as a Source Offset (SO), where the term "source" refers to memory 122. A byte offset of zero indicates the beginning data field byte address coincides (that is, is aligned) with the first data word address. A byte offset greater that zero indicates the beginning data field byte address does not coincide (that is, is not aligned) with the first word address.

Such an offset can exist when the first data word includes one or more header field bytes along with one or more data field bytes. The control information also includes a total number, N, of data field bytes included in the current block of data field bytes to be transferred to and stored in second buffer 226. For example, total number N can represent the number of data bytes between the first and second header field bytes.

At a next step 315, modem controller 202 reads a next data word (which may be the first data word or a subsequent data word) including the beginning data field byte, and possibly additional data field bytes, out of memory 122 using a multiple-byte read operation. For example, modem controller 202 can read a 32-bit (or 4-byte) word from memory 122. Modem controller 202 can use a "Load Register from Memory" (LDR) instruction to perform the read operation when the modem controller is the ARM RISC processor, mentioned above. The one or more data field bytes in the read data word occupy predetermined positions in the data word. The data word read from memory 122 can include exclusively data field bytes, or alternatively, the data word can include a header field byte as well as the one or more data field bytes mentioned above.

At a next step 320, modem controller 202 writes the data word (read in step 315) (and thus, the one or more data field bytes included therein) to second buffer 226 (referred to as "a second memory" in step 320 of FIG. 3A), through DP data organizer 230. Modem controller 202 can use a "Store Register to Memory" (STR) instruction to perform the write operation when the modem controller is the ARM RISC processor, mentioned above. From the perspective of modem controller 202, modem controller 202 is simply writing a data word to second buffer 226 over address/data bus 206/204 during a memory bus write cycle, at step 320. An exemplary memory bus write cycle includes asserting a valid address and valid data on address and data buses 206 and 204, and asserting write signal 210 while the data and address are valid.

At a next decision step 325, modem controller 202 determines whether all of the data field bytes of the data block stored in memory 122 have been transferred from the memory 122 to second buffer 226. If not, flow control returns to step 315, and the next word is read from memory 122, and so on. On the other hand, if all of the data field bytes of the data block have been transferred, method 300 ends. Method 300 can be repeated continuously over time as subsequent data field bytes are received by WCD 104 and stored to first transmit path buffer 216.

Second CPU Method

Figure 3B:
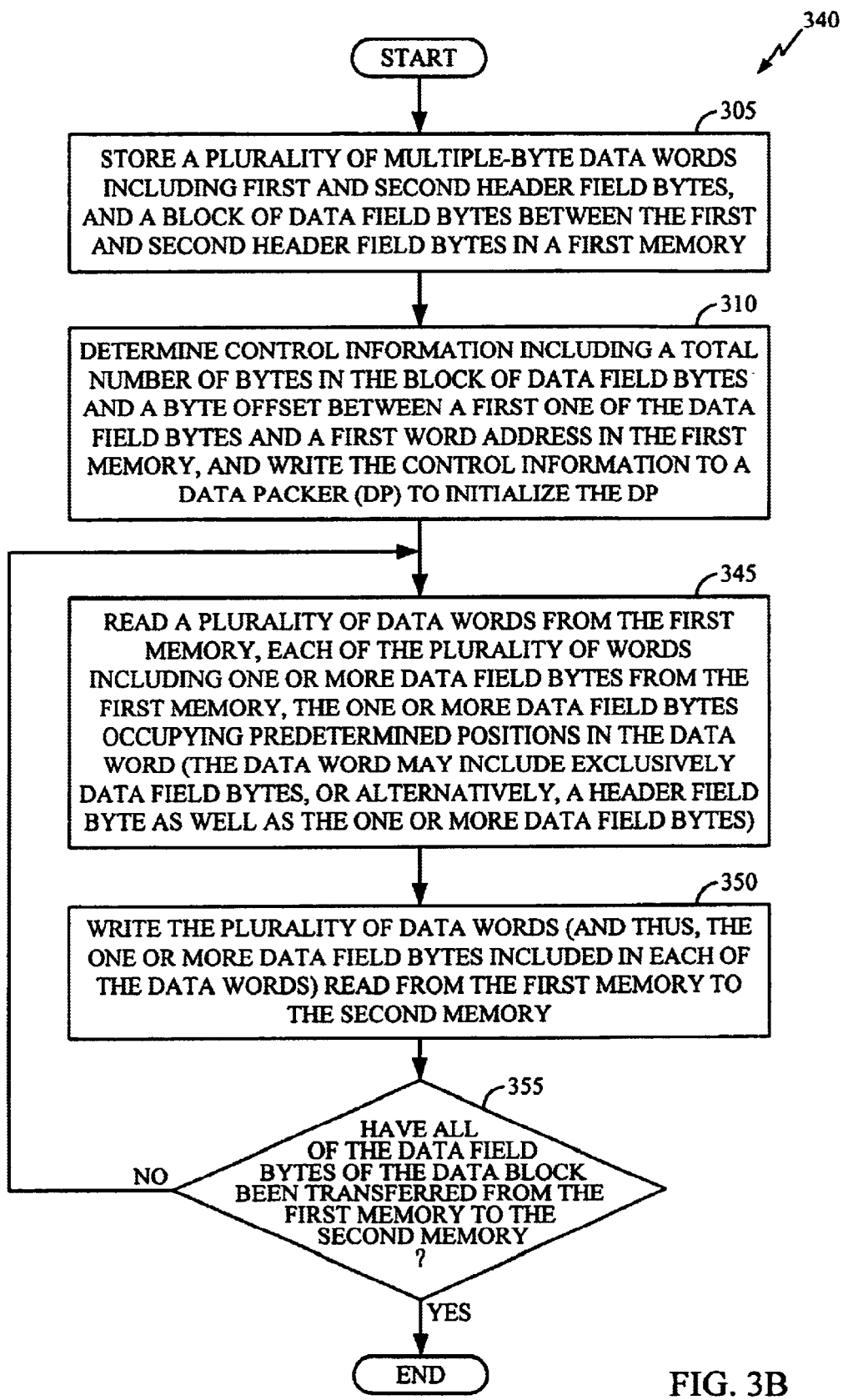
FIG. 3B is a flowchart of an alternative example method of transferring data bytes implemented by a modem controller of FIG. 2 acting in concert with a data packer of FIG. 2.

FIG. 3B is an alternative example method 340 of transferring data bytes according to the present invention. Method 340 includes a series of method steps performed by modem controller 202. The initial two steps of method 340, namely, steps 305 and 310, are the same as those described in connection with method 300.

However, at a next step 345, modem controller 202 reads a plurality of data words from the first memory, instead of the single word read at step 315 of method 300. Modem controller 202 can read the plurality of data words using an efficient data word block read transfer operation. Modem controller 202 can use a "Load Multiple Register" (LDM) instruction, or a derivative thereof, to perform the block read operation when the modem controller is the ARM RISC processor, mentioned above. Using such a block read operation (also referred to as a burst read transfer), modem controller 202 reads each of the plurality of words out of memory 122 one after the other and then into modem controller word registers using a succession (referred to as a burst) of memory read cycles. The number of words modem controller 202 can read using the block read operation is limited only by the architecture of the modem controller.

At a next step 350, modem controller 202 writes the plurality of data words read at step 315 to second buffer 226 (through DP data organizer 230 of DP 220). Modem controller 202 can write the plurality of data words using an efficient data word block write transfer operation. Modem controller 202 can use a "Store Multiple Register" (STM) instruction, or a derivative thereof, to perform the multiple word, or block, write operation when the modem controller is the ARM RISC processor, mentioned above. Using such a block write operation (also referred to as a burst write transfer), modem controller 202 writes each of the plurality of words one after the other to second buffer 226, over address/data bus 206/204, using a succession memory write cycles (referred to as a burst of successive memory write cycles). The successive memory write cycles may be back-to-back in time.

Next decision step 355 is similar to decision step 325 in method 300, except flow returns to step 345 when further data field bytes remain to be transferred. Otherwise, method 340 ends. Method 340 can be repeated continuously over time as subsequent data field bytes are received by WCD104 and stored to first receive path buffer 216.

Data Packer Method

Figure 3C:
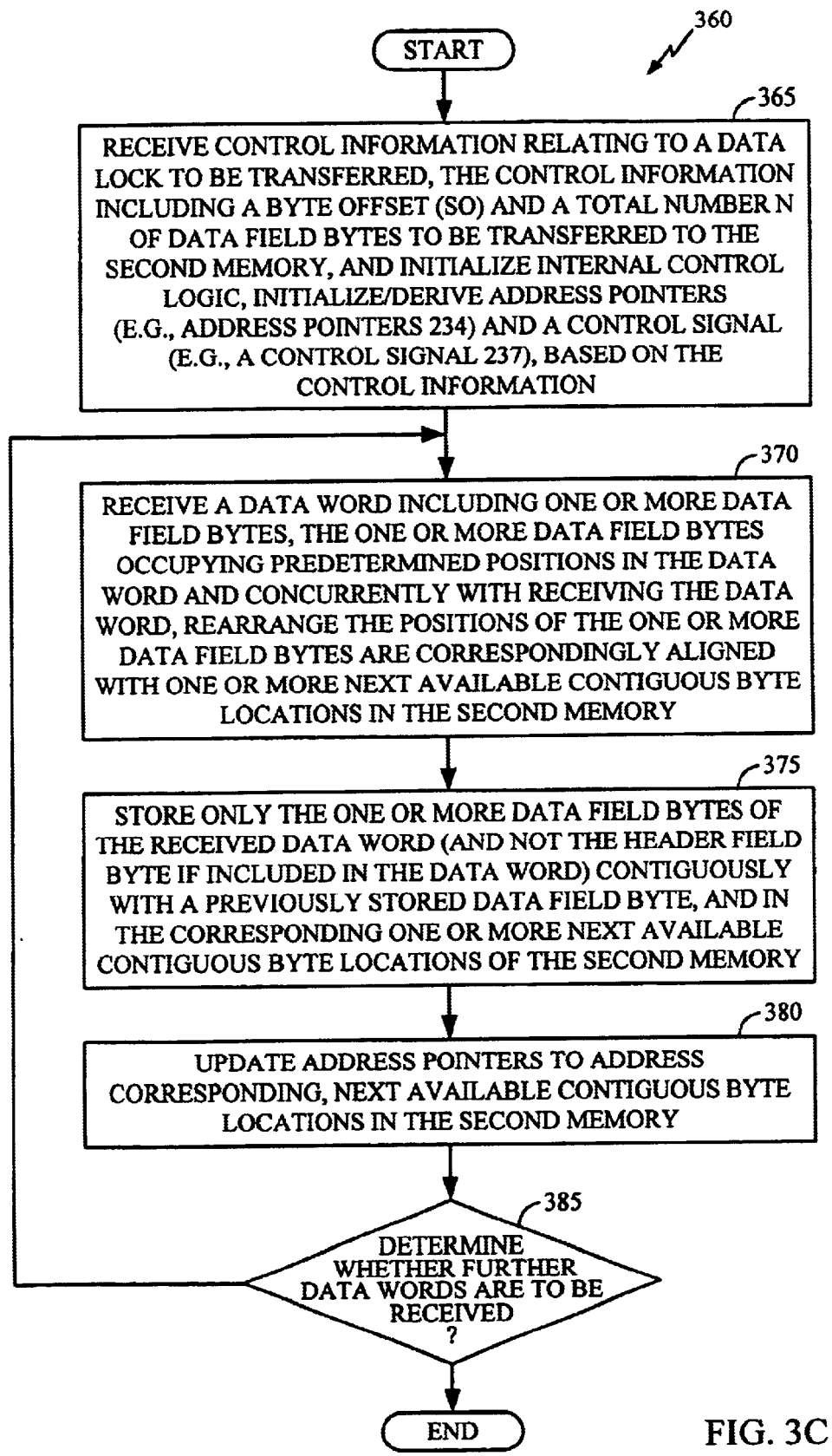
FIG. 3C is a flowchart of an example method of transferring data bytes implemented by a data packer of FIG. 2 acting in concert with a modem controller of FIG. 2.

FIG. 3C is a flowchart of an example method 360 of transferring data bytes according to the present invention. Method 360 includes a series of method steps performed by DP 220 in concert with CPU methods 300 and 340 described above, according to the present invention.

Method 360 begins at a step 365 when DP 220 receives control information from modem controller 202 (that is, when modem controller 202 writes the control information to DP 220 in step 310, as discussed above in connection with method 300). In step 365, DP controller 232 initializes internal control logic, and derives address pointers 234 and control signal 237, based on the byte offset (SO) and the total number N of data field bytes received from modem controller 202.

A next step 370 is initiated when DP 220 receives a data word including one or more data field bytes from modem controller 202 (that is, when modem controller 202 writes the data word to DP data organizer 230 in steps 320 and 350 of respective CPU methods 300 and 340). Preferably, DP 220 performs step 370 concurrently with modem controller 202 write step 320, and concurrently with individual ones of the plurality of write operations performed by modem controller 202 at write step 350 (as will be described further below). The term "concurrently" used herein means DP 220 performs step 370 during or within a memory write cycle of modem controller 202. Alternatively, the term "concurrently" means step 370 is completed before a next memory write cycle begins. For example, when modem controller 202 executes a current write cycle back-to-back with a next write cycle, as in the case when the RISC processor mentioned above performs an STM instruction to transfer multiple data words to DP 220, a current step 370 associated with the current write cycle should be completed before the next write cycle begins because the next write cycle will initiate a next step 370.

In step 370, DP data organizer 230 organizes (for example, re-arranges if necessary) the positions of the one or more data field bytes of the received data word in accordance with control signal 237 such that the one or more data field bytes are correspondingly aligned with one or more next available contiguous byte locations in second buffer 226. For example, when the byte offset (that is, the SO) received by DP controller 232 in step 365 is non-zero indicating there are header field bytes to be ignored in a first received data word of a current data field block transfer, DP organizer 230 re-arranges the positions of the one or more data field bytes in the first received data word. This will be further described below.

Modem controller write step 320 (of method 300) and organizing step 370 together transfer data field bytes from modem controller 202 to second receive path buffer 226, because organized data field bytes are presented to the second buffer in a correct order at the end of step 370. Similarly, modem controller write step 350 (from method 340) and organizing step 370 together transfer data bytes from modem controller 202 to second receive path buffer 226.

At a next step 375, DP controller 232 causes only the one or more (possibly re-arranged) data field bytes of the received data word (and not the header field byte if included in the received data word) to be stored in the corresponding one or more next available contiguous byte locations (mentioned above in step 370), and contiguously with a previously stored data field byte, of second buffer 226. In step 375, DP controller 232 stores the one or more data field bytes using address pointers 234 and write signals 236. Preferably, DP 220 performs step 375 concurrently with write steps 320 and 330.

At a next step 380, DP controller 232 updates address pointers 234 to address corresponding, next available contiguous byte locations in second buffer 226.

At a next decision step 385, DP controller 232 determines whether further data words are to be received in the current data block transfer from memory 122, based on the total number N of bytes to be transferred and the number of data words previously received during the current data block transfer. When no further data words are to be received, method 360 ends. On the other hand, when further data bytes are to be received, flow control returns to step 370, where DP 220 waits for a next data word to be transferred from modem controller 202.

Overall (Combined CPU and Data Packer) Method

FIG. 4 is a flow chart of an example overall method 400 of transferring a block of data field bytes from a first memory to a second memory, according to the present invention. Method 400 combines CPU method 340 performed by modem controller 202, and method 360 performed by DP 220, both described above. An alternative overall method (not shown) combines CPU method 300 and DP 220 method 360. Since method 400 includes previously described method steps, a detailed description of the method steps will not now be provided so as to avoid unnecessary descriptive repetition. It is to be understood that decision step 385 of method 360 is omitted from FIG. 4 only for purposes of descriptive clarity.

Initial steps 305, 310, and 365 of method 400 establish a plurality of data words including header field bytes and data field bytes in memory 122, and initialize DP 220, as described above. Next step 345 transfers a plurality of data words from memory 122 to modem controller 202. Next steps 350$i$, 370, 375, and 380 are repeated each time modem controller 202 writes one of the plurality of data words read in step 345 to DP 220. For example, in step 350$i$, modem controller 202 writes a single one of the plurality of data words read in step 345 to DP 220. Therefore, step 350$i$ of method 400 corresponds to a single one of the plurality of successive writes (or burst of writes) performed in step 350 of method 340, wherein modem controller 202 writes the plurality of data words to modem controller 202.

High-Level Illustrative Example

Figures 5A, 5B, 5C:
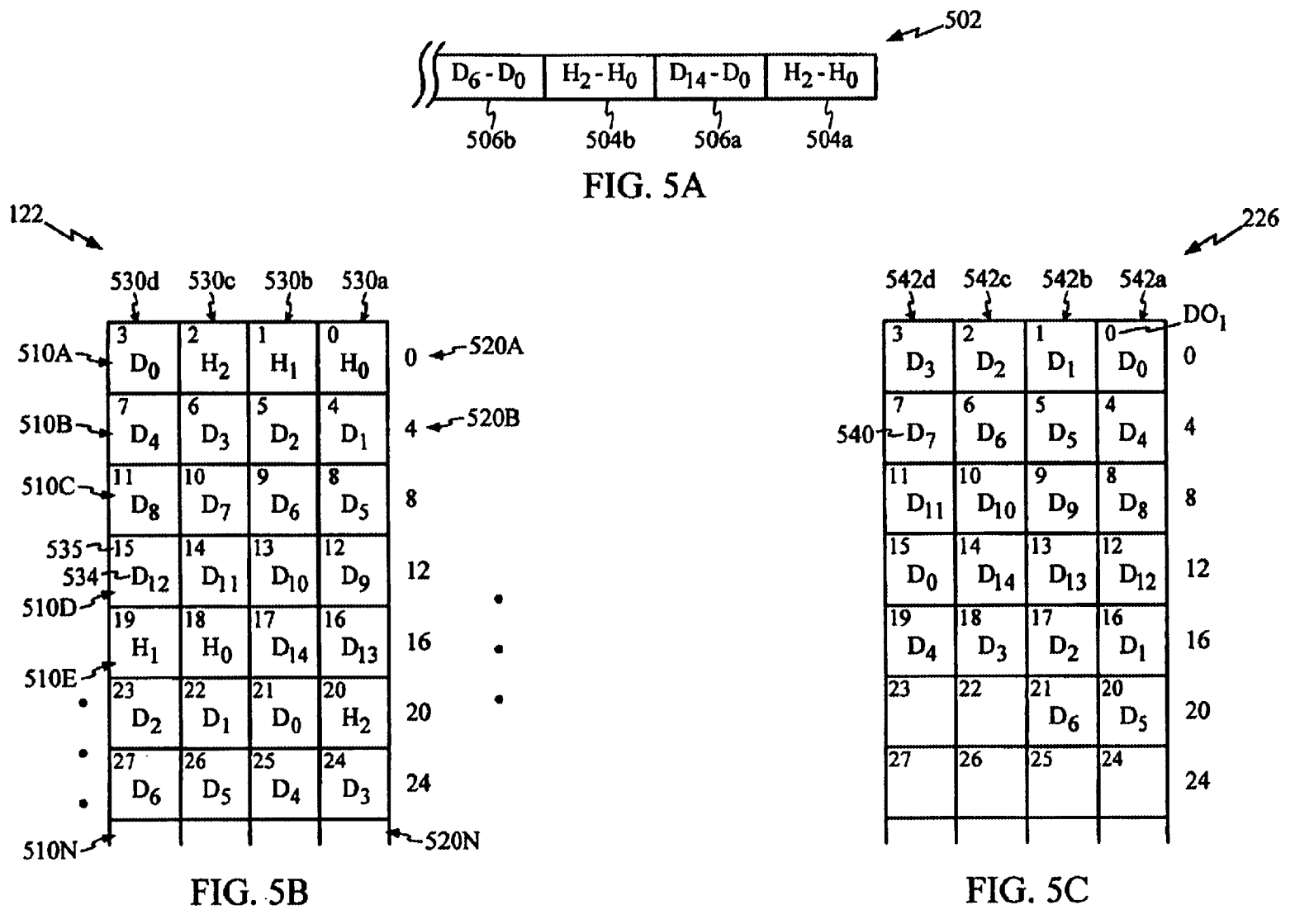

A high-level illustrative data transfer example implemented in accordance with method 400 is now described. FIG. 5A is an example signal 502 (similar to signal 140 discussed in connection with FIG. 1) received by antenna 106. Example received signal 502 includes header fields 504a and 504b, and data fields 506a and 510b, where header field 504a is received first in time. Header field 504a includes three header bytes $H_0$ through $H_2$ (where $H_0$ is received before $H_2$), data field 506a includes fifteen bytes $D_0$–$D_{14}$ representing a first block of data field bytes, and so on.

In step 305 described above, modem 120 stores a series of data words, including both header and data field bytes of signal 502, in memory 122. FIG. 5B is an illustration of an example arrangement and example contents of memory 122 after the header and data field bytes have been stored therein in step 305. In this example, memory 122 includes a series of 32-bit (or 4-byte) data word locations (depicted in FIG. 5B as rows of memory 122) each having one of data words 510a–510n stored therein. Each word location is addressed by a corresponding word address 520a–520n, such as "0," "4," and so on. Each word location can store a 32-bit (or 4-byte) word. That is, each word location includes 4-byte locations, represented by columns or byte positions 530a, 530b, 530c, and 530d in the word. Therefore, memory 122 includes a plurality of memory "cells," each individual memory "cell" (for example, cell 534) representing a byte location in memory 122. Each byte location (for example, 534) has a corresponding byte address, indicated in a corresponding upper left-hand corner of the cell in FIG. 5. For example, byte location or cell 534 has a corresponding byte address "15."

In the example, header field bytes $H_0$–$H_2$ of header field 504a occupy byte locations corresponding to byte addresses "0"–"2" of data word 510a (having word address 520a) in memory 122. A first block of data field bytes $D_0$–$D_{14}$ occupies a plurality of next contiguous byte locations corresponding to byte addresses "3"–"17" spanning contiguous word addresses "0," "4," "8," "12" and "16." Header field bytes $H_0$–$H_2$ of next header field 504b occupy corresponding, contiguous byte locations corresponding to byte addresses "18"–"20" spanning word addresses "16" and "20." A second block of data field bytes $D_0$–$D_6$ corresponding to second data field 506b occupy corresponding, contiguous byte locations corresponding to byte addresses "21"–"27."

FIG. 5C is a diagram of an example memory arrangement of second buffer 226. Depicted in FIG. 5C are example contents of second buffer 226, after the first and second data field blocks (corresponding to data fields 506a and 506b, respectively) have been transferred from memory 122 to second buffer 226 and then stored in the second buffer using the present invention. The memory arrangement of second buffer 226 depicted in FIG. 5C includes a plurality of byte locations 540 (or cells 540) arranged in rows similarly to the byte locations of memory 122. Each byte location 540 can store a data field byte transferred from memory 122 to second buffer 226. In the exemplary arrangement depicted in FIG. 5C, second buffer 226 includes columns of cells (that is, byte columns) 542a, 542b, 542c, and 542d corresponding to columns of cells 530a, 530b, 530c, and 530d of memory 122.

After the first and second data field blocks have been transferred to and stored in buffer 226 according to the present invention, the data field bytes $D_0$–$D_{14}$ of the first block of data field bytes are stored in corresponding contiguous byte locations having addresses "0"–"14" of second buffer 226. The data field bytes $D_0$–$D_{14}$ are stored in the same byte order in second buffer 226 as they are stored in memory 122. Similarly, the data field bytes $D_0$–$D_6$ of the second block of data field bytes are stored in corresponding contiguous byte locations "15"–"21" of second buffer 226, and in the same byte order as they were stored in memory 122. Also, a first data field byte $D_0$ of the second block of data field bytes is stored contiguously with a last data field byte $D_{14}$ of the previously stored, first block of data field bytes. Therefore, DP 220 strips the header field bytes from the data words received from modem controller 202, and packs the remaining data field bytes of the received data words into the second buffer, as depicted in FIG. 5C, for example.

Data Packer Embodiment

Figure 6:
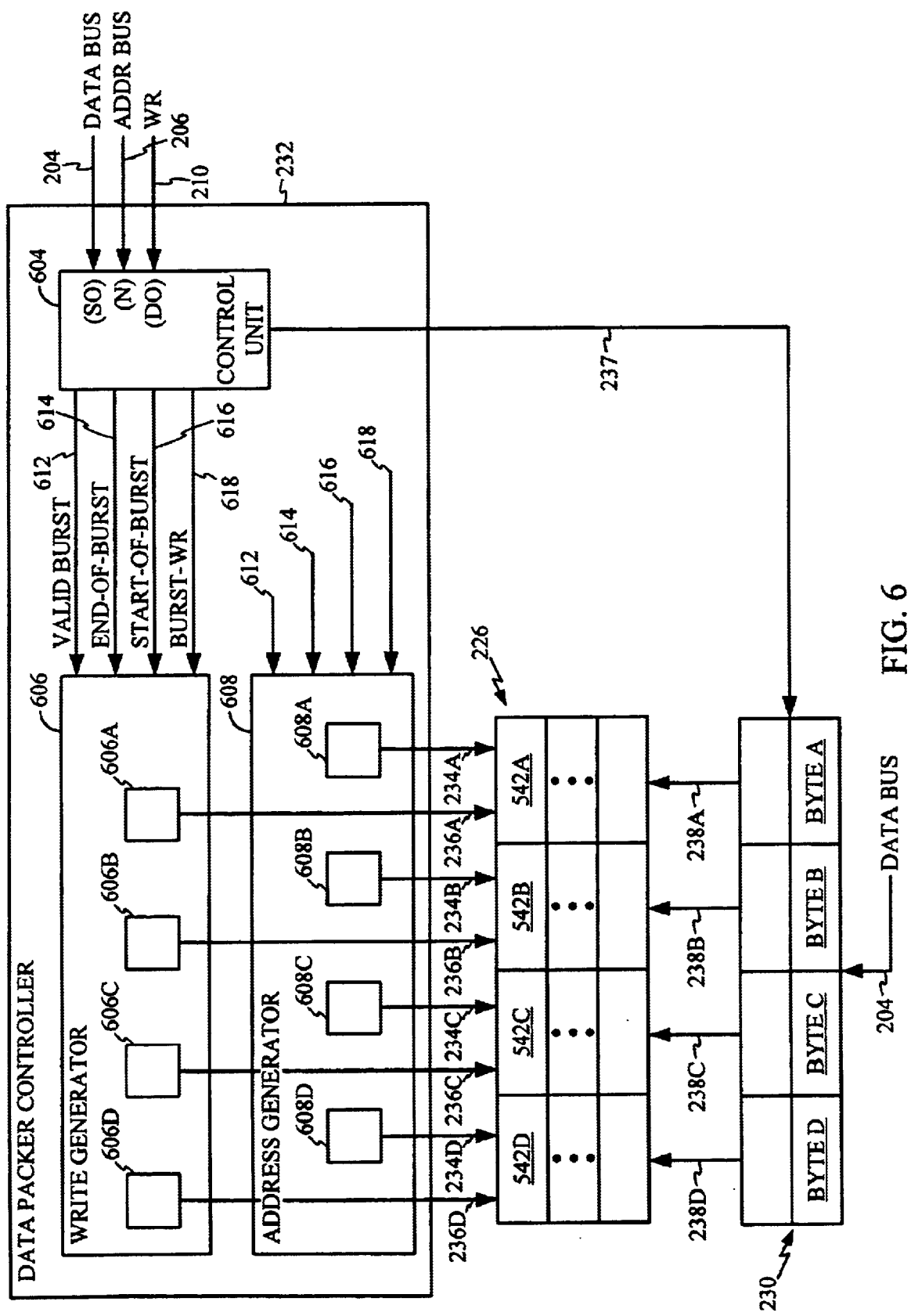
FIG. 6 is a block diagram of an example data packer of FIG. 2.

It is helpful to appreciate further details of DP 220 before describing method 400 in further detail. Therefore, DP 220 is now described in further detail. FIG. 6 is a detailed block diagram of DP 220, according to an embodiment of the present invention. DP 220 can be implemented as one or more Application Specific Integrated Circuits (ASICs). In FIG. 6, DP controller 232 and DP data organizer 230 are depicted in relation to second buffer 226. DP controller 232 includes a control unit 604, a write generator 606, and an address generator 608. Control unit 604 can include any one of or a combination of counter logic, comparing logic, and state machine logic necessary to control write generator 606, address generator 608, and DP organizer 230 in accordance with the present invention. Control unit 604 receives initializing data words over data bus 204 (for example, at steps 310 of methods 300 and 400, discussed above in connection with FIGS. 3 and 4), and addresses over address bus 206, along with write signal 210. Control unit 604 derives a valid_burst_signal 612, an end_of_burst signal 614 (indicative of a last data word transfer in a current data block transfer), a start_of_burst signal 616 (indicative of a first or start data word transfer in a current data block transfer), and a burst_wr signal 618 (derived based on write signal 210) based on the initializing data word (including the control information) received over data bus 204 and write signal 210 during a data block transfer. The term "burst" used herein refers to a block of data field bytes to be transferred from memory 122 to second buffer 226, and is therefore synonymous with "data block transfer." Control unit 604 provides signals 612–618 to both write generator 606 and address generator 608. Control unit 604 also derives control signal 237 based on the initializing data words received by DP controller 232.

Address generator 608 includes address units 608a, 608b, 608c, and 608d (collectively and generally referred to as address units 608) corresponding to byte columns 542a, 542b, 542c, and 542d (collectively and generally referred to as byte columns 542) of second buffer 226. Address unit 608a includes logic (such as counter logic) to derive or generate an address pointer 234a based on signals 612–618 received from control unit 604. Address unit 608a provides address pointer 234a to corresponding byte column 542a of second buffer 226 over address bus 234 (discussed above in connection with FIG. 2). DP 220 uses address pointer 234a to address a next available byte location in byte column 542a of second buffer 226. Similarly, address units 608b–608d provide respective address pointers 234b–234d to respective byte columns 542b–542d. Each of address units 608 can independently address a respective byte location in the corresponding one of byte columns 542 of second buffer 226.

Write generator 606 includes a plurality of write units 606a, 606b, 606c, and 606d (collectively and generally referred to as write units 606) each corresponding to a respective one of byte columns 542 of second buffer 226. Write unit 606a includes logic to derive a byte-write signal 236a based on signals 612–618 received from control unit 604. Write unit 606a asserts byte-write signal 236a when a data field byte is to be written into a next available byte location in byte column 542a of second buffer 226. Write unit 606a preferably asserts byte-write signal coincidentally with write signal 210 (provided by, for example, modem controller 202) such that bytes in a data word written to data packer 220 (by modem controller 202, for example) can be concurrently written to (that is, stored in) second buffer 226 (as will be described in further detail below). When byte-write signal 236a is asserted, a data field byte presented to second buffer 226 over data bus 238 (discussed above in connection with FIG. 2) is written into (that is, stored in) the byte location addressed by address pointer 234a at the time when the byte-write signal is asserted. Similarly, each of write units 606b–606d derive a respective one of byte-write signals 236b–236d (where byte write signals 236a–236b are collectively and generally referred to as byte-write signals 236, also mentioned above in connection with FIG. 2), and provides the byte-write signal so derived to respective ones of write columns 542b–542d. Each of byte-write signals 236 can be asserted independently of the other byte-write signals, whereby a data byte can be written to (that is, stored in) any one of byte columns 542 independently of the other byte columns, in response to the corresponding byte-write signal. This is useful when only selected ones of a plurality of data field bytes presented to second buffer 226 are to be stored in the second buffer, as will be further described below.

DP organizer 230 receives 32-bit (that is, 4-byte) data words over data bus 204. Each byte received in the data word occupies a predetermined byte position in the data word, as indicated by the positions of the bytes labeled as "byte a," "byte b," "byte c," and "byte d," in FIG. 6. DP data organizer 230 organizes (for example, re-orders when necessary) the byte positions of each byte received by the data organizer in accordance with control signal 237. DP organizer 230 provides a data byte 238a to byte column 542a of second buffer 226 (over data bus 238, discussed above in connection with FIG. 2). Data byte 238a can be any one of the data bytes "byte a," "byte b," "byte c," and "byte d," depending on control signal 237. For example, byte 238a can be "byte a" when control signal 237 indicates the original or received order of bytes a–d is to be preserved. On the other hand, byte 238a can be any one of bytes b–d depending on control signal 237. When byte-write signal 236a is asserted, byte 238a is written to (that is, stored in) the byte location addressed by address pointer 234a. Similarly, DP data organizer 230 provides data bytes 238b–238d to respective byte columns 542b–542d over data bus 238. Each of data bytes 238b–238d is respectively written to the corresponding one of byte columns 542b–542d based on the corresponding byte-write signal 236b–236d. The byte-write to each byte column in second buffer 226 is controlled and performed independently of the byte-writes to the other byte columns of second buffer 226.

In the present invention, when modem controller 202 writes a data word to DP data organizer 230 over data bus 204 and using write signal 210, the DP data organizer organizes (for example, re-orders when necessary) the positions of the bytes of the data word received from the modem controller concurrently with the modem controller write operation. Also, as mentioned above, write generator 606 derives byte-write signals 236d–236a coincidentally with write signal 210 such that re-organized bytes 238a–238d produced by DP data organizer 230 can be stored in second buffer 226 concurrently with the modem controller 202 data word writes to the data organizer. Therefore, when modem controller 202 writes a data word to data packer 220 so as to store data field bytes of the data word in second buffer 226, the data packer acts as an intermediary to advantageously organize the data field bytes in the data word and store the data field bytes where appropriate in the second buffer concurrent with the write operation and in a manner transparent to the modem controller.

Detailed Method

Method 400 is now further described by way of an example and with reference to FIGS. 2–6, and FIG. 7, described below. Further reference is made to a series of illustrations depicted in FIGS. 8A–8E, also described below. At the outset, the example assumes signal 502 discussed above in connection with FIG. 5A is received by WCD 104, and all of the data bytes associated with signal 502 are delivered to first receive path buffer 216. It is also assumed second buffer 226 is initially empty, and thus waiting to receive a first transfer of data field bytes from memory 122 in accordance with the present invention.

Figure 7:
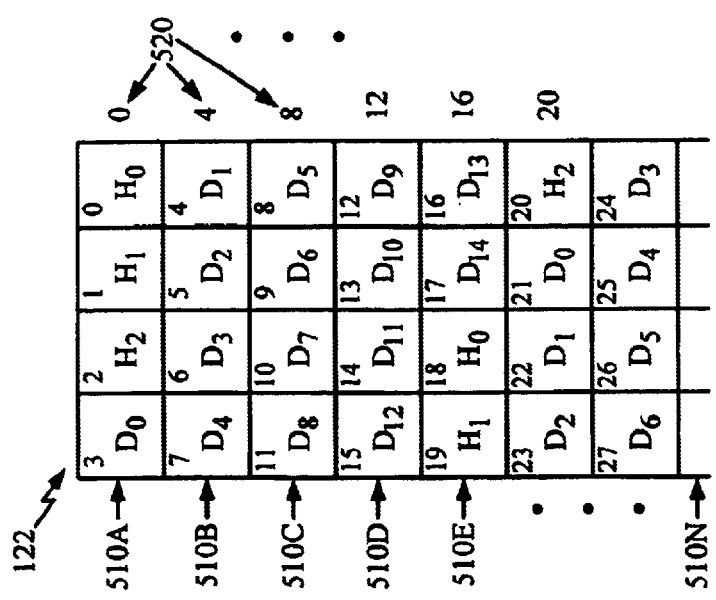
FIG. 7 is an illustration similar to FIG. 5B, reproduced for convenience.

At initial step 305 of method 400, modem controller 202 transfers data bytes stored in first receive path buffer 216 to memory 122. FIG. 7 is an illustration of memory 122 after step 305 is performed. FIG. 7 is the same as FIG. 5B and is reproduced here for convenience.

At step 310, modem controller 202 examines memory 122 to determine control information required to initialize DP 220. Modem controller 202 determines a byte offset (SO) between beginning data field byte $D_0$ and the first word address "0" of first word 510a in memory 122. In the example, the byte offset is "3" because first word 510a includes header bytes $H_0$–$H_2$ along with beginning data field byte $D_0$. Modem controller 202 also determines a total number N of data field bytes in the first block of data field bytes to be transferred to second buffer 226. In the example, N=15, corresponding to data field bytes $D_0$–$D_{14}$. Modem controller 202 writes an initializing data word including the control information (byte offset=3 and total number N=15) to DP 220.

At step 365, DP controller 232 initializes logic (for example, address generator 608 and write generator 606) for the current data block transfer including data bytes $D_0$–$D_{14}$ based on the received control information. For example, control unit 604 initializes internal control logic, counters, state-machines, etc., required for deriving signals 612–616. Control unit 604 also derives a value of DP organizer control signal 237 based on the control information. Control unit 604 maintains the value of control signal 237 throughout an entire block transfer of data field bytes from memory 122 to second buffer 226.

FIG. 8A is an illustration of a portion of second buffer 226 and portions of DP 220, at different stages of method 400 in the present example. Second buffer 226 is depicted in an initially empty state in FIG. 8A. Also, address pointers 234 are depicted in an initial state in FIG. 8A. Each of address pointers 234a, 234b, 234c, and 234d (also referred to as respective address pointers Pa, Pb, Pc, and Pd, for purposes of descriptive convenience) points to (that is, addresses) a next available (for example, empty) byte location in the corresponding one of byte columns 542 of second buffer 226. Since second buffer 226 is initially empty, a first byte location is available in each of byte columns 542, such that pointers Pa–Pd respectively point to byte addresses "0"–"3" in the second buffer. The state of data organizer 230, as depicted in FIG. 8A, will be described below.

At next step 345, modem controller 202 reads the five data words 510a–510e including data field bytes $D_0$–$D_{14}$ out of respective memory word locations "0"–"16" using five multiple-byte word read operations. In doing so, modem controller 202 indiscriminately reads data words including both header and data field bytes (for example, first and last data words 510a and 510e, respectively).

First Write

In a first pass through next step 350i (that is, when i=1), modem controller 202 writes first data word 510a to DP data organizer 230. In doing so, modem controller 202 indiscriminately writes the data and header field bytes included in word 510a to DP data organizer 230.

In step 370, DP data organizer 230 receives first data word 510a such that header field bytes $H_0$, $H_1$, and $H_2$, and data field byte $D_0$, respectively occupy byte positions in the DP data organizer aligned with byte columns 542a, 542b, 542c, and 542d of second buffer 226, as depicted in FIG. 8A. DP data organizer 230 re-arranges the positions of the received data field bytes in accordance with control signal 237 so as to align the received data field bytes with next available contiguous byte locations in second buffer 226. In the example, DP data organizer 230 rotates the received bytes three positions to the right in a clockwise direction (or alternatively, one position to the left in a counter-clockwise direction) in response to control signal 237, so as to align received, beginning data byte $D_0$ with first byte location "0" coinciding with first byte column 542a of second buffer 226. After the 3-byte clockwise (or alternatively, 1-byte counter-clockwise) rotate operation of step 370, organized bytes 238a, 238b, 238c, and 238d (see FIG. 6) respectively correspond to data field bytes $D_0$, $H_0$, $H_1$, and $H_2$, as depicted in FIG. 8A.

At next step 375, DP controller 232 stores only the data field bytes (and not the header field bytes) received by DP data organizer 230, in second buffer 226. DP controller 232 uses write generator 606a to assert only write signal 236a, thereby storing only data field byte $D_0$ (corresponding to data byte 238a) in the first byte location corresponding to byte address "0" of second buffer 226, in accordance with address pointer Pa (initially pointing to byte address "0" in second buffer 226). Therefore, header field bytes $H_0$–$H_2$ are ignored in storing step 375.

At next step 380, address generator 608 updates address pointers Pa–Pd such that the address pointers address next available contiguous byte locations in second buffer 226. In the example, address generator 608 updates only address pointer Pa since only byte column 542a received a data field byte (that is, data field byte $D_0$ stored in previous location "0") at step 375. FIG. 8B is an illustration of the contents of second buffer 226 after byte storing step 375, and pointers Pa–Pb after address updating step 380. Only beginning data field byte $D_0$ has been stored in second buffer 226. The state of DP organizer 230 depicted in FIG. 8B is described below.

Second Write

After step 380, flow returns to step 350i, for a second pass through steps 350i (where i=2), 370, 375 and 380, since further read words 510b–510e remain to be written to second buffer 226 in the current data block transfer to the second buffer. In the second pass through step 350i, modem controller 202 writes second data word 510b (a middle data word) to DP data organizer 230.

In step 370, DP data organizer 230 receives second data word 510b such that data field bytes $D_1$, $D_2$, $D_3$, and $D_4$, respectively occupy byte positions in the data organizer aligned with byte columns 542a, 542b, 542c, and 542d, as depicted in FIG. 8B. Also in step 370, DP data organizer 230 again rotates the received bytes three positions to the right in the clockwise direction (or alternatively, one position to the left in a counter-clockwise direction) in response to control signal 237, so as to align received bytes $D_1$, $D_2$, $D_3$, and $D_4$ with corresponding contiguous, next available byte locations corresponding to byte addresses "1," "2," "3," and "4," respectively coinciding with byte columns 542b, 542c, 542d, and 542a. After the 3-byte rotate (or 1-byte rotate) operation of step 370, organized bytes 238a, 238b, 238c, and 238d respectively correspond to data field bytes $D_4$, $D_1$, $D_2$, and $D_3$, as depicted in FIG. 8B.

At next step 375, DP controller 232 uses write generator 606 to assert all of write signals 234a–234d, thereby storing all of data field bytes $D_1$–$D_4$ in contiguous byte locations corresponding to byte addresses "1"–"4" of second buffer 226, in accordance with address pointers 234a–234d. Also, the data field bytes $D_1$–$D_4$ are stored in second buffer 226 in the same byte order the data field bytes were stored in memory 122.

At next step 380, address generator 608 updates (in this embodiment, increments) all of address pointers Pa–Pd since all of the byte-columns 542 received data field bytes in step 375, such that the address pointers address next available contiguous byte locations corresponding to byte addresses "5"–"8" in second buffer 226. FIG. 8C is an illustration of the contents of second buffer 226 after the second pass through write step 375 and pointers Pa–Pb after the second pass through pointer update step 380. After step 375, the data field bytes $D_0$–$D_4$ are stored in second buffer 226 in the same byte order they were stored in memory 122. It is also appreciated from the above description that address generator 606 increments each of pointers Pa–Pd after a data field byte is stored in each corresponding byte column. The state of DP organizer 230 depicted in FIG. 8C is described below.

Third and Fourth (Middle) Writes

Modem controller 202 writes middle data words 510c and 510d to second buffer 226 during respective third and fourth passes through steps 350–380 of method 400. FIG. 8D is an illustration of the contents of second buffer 226 and the state of pointers Pa–Pd after the fourth pass through step 380. The state of DP data organizer 230 depicted in FIG. 8D is described below.

Fifth and Last Write

Modem controller 202 writes last data word 510e to second buffer 226 in a last or fifth pass through step 350i (where i=5), in a last pass through steps 350i–380 to complete the current data block transfer from memory 122 to second buffer 226. In step 370, DP data organizer 230 again rotates the received bytes three positions to the right (or one byte to the left), to align bytes $D_{13}$ and $D_{14}$ with next available byte locations (corresponding to byte addresses "13" and "14") contiguous with previously stored data field byte $D_{12}$ (see FIG. 8D).

In next step 380, write generator 606 asserts only write signals 236b and 236c to store only data field bytes $D_{13}$ and $D_{14}$ of data word 510e in byte locations "13" and "14," thereby ignoring header field bytes $H_0$ and $H_1$ also included in data word 510e. FIG. 8E is an illustration of the contents of second buffer 226 and the state of pointers Pa–Pd after the fifth pass through step 380. After step 380, the first block of data field bytes including data field bytes $D_0$–$D_{14}$ have been transferred from memory 122 to second buffer 226 and stored in contiguous byte locations in second buffer 226, and in the same byte order as the bytes were stored in memory 122. Also, pointers Pa–Pd are addressing next available contiguous byte locations, contiguous with previously stored data field byte $D_{15}$, in second buffer 226. The locations indicated by pointers Pa–Pd represent initial second buffer addresses for the next block of data field bytes to be transferred to and stored in the second buffer 226.

Method 400 is repeated to transfer the next (or second) block of data field bytes including data bytes $D_0$–$D_6$ from byte addresses "21"–"27" of memory 122 to second buffer 226. In accordance with the present invention, the first data field byte of the next data field block (byte $D_0$ in location address "21" of memory 122) is transferred to and stored in byte location address "15," that is, contiguously with previous stored data field byte $D_{14}$, in second buffer 226, and so on.

Data Organizer

An advantage of the present invention is the ability to transfer data words to second buffer 230 and store relevant, organized data bytes in the second buffer in a timely manner, for example, concurrently with writing the data words to the second buffer. DP data organizer 230 supports such advantageous operation in the present invention. FIG. 9 is a detailed block diagram of DP data organizer 230 and second buffer 226, according to an embodiment of the present invention. Data organizer 230 includes a data buffer 904 coupled to data bus 204 and a plurality of multiplexers 906a, 906b, 906c, and 906d (collectively and generally referred to as multiplexers 906) coupled to data buffer 904. Data buffer 904 receives data bits D31:0 (that is, data bits "31"–"0") over data bus 204. Data buffer then provides:

1. data bit set D31:24 to each of multiplexers 906 over a byte-wide (that is, 8-bits wide) data bus $908_3$;
2. data bit set D23:16 to each of multiplexers 906 over a byte-wide data bus $908_2$;
3. data bit set D15:8 to each of multiplexers 906 over a byte-wide data bus $908_1$; and
4. data bit set D7:0 to each of multiplexers 906 over a byte-wide data bus $908_0$ (where data buses $908_0$, $908_1$, $908_2$, and $908_3$ are collectively and generally referred to as byte-wide data buses 908).

Each of multiplexers 906 includes four byte-wide inputs "0," "1," "2," and "3." Each of these byte-wide inputs is coupled to a respective one of byte-wide buses 908, and thereby receives a corresponding set of eight data bits (for example, D7:0, and so on). Each of multiplexers 906 includes a select input "S" for receiving control signal 237 from DP controller 232. Each of multiplexers 906 provides a selected set of eight data bits (that is, a selected data byte), selected from the four sets of eight data bits (that is, selected from the four data bytes) presented to the multiplexer inputs "0"–"3," to an output "O" of the multiplexer, based on control signal 237. Values of "0," "1," "2," and "3" of control signal 237, select bytes from respective multiplexer inputs "0," "1," "2," and "3." Multiplexers 906a, 906b, 906c, and 906d, have respective outputs O corresponding to data bytes 238a, 238b, 238c, and 238d, described above in connection with FIG. 6.

Because each of multiplexers 906 receives the same select control signal 237, the order of the data bit sets (that is, sets D31:24, D23:16, D15:8, and D7:0) provided to byte-wide inputs "0"–"3" of each of multiplexers 906 is permuted with respect to each of the other multiplexers. For example, byte-wide input "0" of multiplexers 906a, 906b, 906c, and 906d, respectively receive different data bit sets D7:0, D15:8, D23:16, and D31:24, and so on, as depicted in FIG. 9. This enables each of multiplexers 906 to provide an appropriate data byte (that is, data bit set) to data bus 238 based on the same control signal 237 provided to each of the other multiplexers. An illustrative example is provided below.

Second receive path buffer 226 includes four independent byte-wide RAMs, each corresponding to a respective one of byte columns 542 of the second buffer. Therefore, each of the four RAMs depicted in FIG. 9 is given the same reference number as the byte column to which it corresponds (for example, 542a, etc.). Multiplexers 906a–906d provide corresponding organized bytes 238a–238d to corresponding RAMs 542a–542b. Also, each of RAMs 542 receives a corresponding one of write signals 236 and a corresponding one of address pointers 234, as described above in connection with FIG. 6.

In operation, DP data organizer 230 maintains a received byte order when control signal 237 has a value="0." In this case, multiplexers 906a, 906b, 906c, and 906d, respectively provide data bytes D7:0, D15:8, D23:16, and D31:24 as output bytes 238a, 238b, 238c, and 238d. Therefore, DP data organizer 230 does not rotate (that is, re-order) the positions of the received data bytes.

When control signal 237 has a value="1," multiplexers 906a, 906b, 906c, and 906d, respectively select data bytes D31:24, D7:0, D15:8, and D23:16 as respective output bytes 238a, 238b, 238c, and 238d. Therefore, DP data organizer 230 rotates (that is, re-orders) the positions of the received data bytes one position to the left in a counter-clockwise direction. Similarly, when control signal 237 has values of 2 or 3, DP data organizer 232 rotates the received bytes 2 or 3 bytes to the left.

Computer System

The methods of the present invention are implemented using a controller (for example, modem controller 202) and a data packer (for example, data packer 220) both operating in the context of a computer based system. Although communication-specific hardware can be used to implement the present invention, the following description of a general purpose computer system is provided for completeness. The present invention is preferably implemented in a combination of software executed by modem controller 202, for example, and hardware forming data packer 220 (and 252). Consequently, the invention may be implemented in a computer system or other processing system.

An example of such a computer system 1000 is shown in FIG. 10. In the present invention, the above described methods or processes, for example, methods 300 and 340, execute on computer system 1000. The computer system 1000 includes one or more processors, such as processor 1004 (corresponding to modem controller 202, for example). The processor 1004 is connected to a communication infrastructure 1006 (for example, a bus or network, which can include address and data buses 206 and 204 discussed in connection with FIG. 2). Various software implementations are described in terms of this exemplary computer system. After reading this description, it will become apparent to a person skilled in the relevant art how to implement the invention using other computer systems and/or computer architectures.

Computer system 1000 also includes a main memory 1008, preferably random access memory (RAM), and may also include a secondary memory 1010. The secondary memory 1010 may include, for example, a hard disk drive 1012 and/or a removable storage drive 1014, representing a floppy disk drive, a magnetic tape drive, an optical disk drive, etc. The removable storage drive 1014 reads from and/or writes to a removable storage unit 1018 in a well known manner. Removable storage unit 1018, represents a floppy disk, magnetic tape, optical disk, etc. which is read by and written to by removable storage drive 1014. As will be appreciated, the removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Examples of communications interface 1024 may include a modem, a network interface (such as an Ethernet card), a communications port, a PCMCIA slot and card, etc. Software and data transferred via communications interface 1024 are in the form of signals 1028 which may be electronic, electromagnetic, optical or other signals capable of being received by communications interface 1024. These signals 1028 are provided to communications interface 1024 via a communications path 1026. Communications path 1026 carries signals 1028 and may be implemented using wire or cable, fiber optics, a phone line, a cellular phone link, an RF link and other communications channels.

In this document, the terms "computer program medium" and "computer usable medium" are used to generally refer to media such as removable storage drive 1014, a hard disk installed in hard disk drive 1012, and signals 1028. These computer program products are means for providing software to computer system 1000.

Computer programs (also called computer control logic) are stored in main memory 1008 and/or secondary memory 1010. Computer programs may also be received via communications interface 1024. Such computer programs, when executed, enable the computer system 1000 to implement the present invention as discussed herein. In particular, the computer programs, when executed, enable the processor 1004 to implement the process of the present invention. Accordingly, such computer programs represent controllers of the computer system 1000. By way of example, in a preferred embodiment of the invention, the processes performed by modem controller 202 can be performed by computer control logic. Where the invention is implemented using software, the software may be stored in a computer program product and loaded into computer system 1000 using removable storage drive 1014, hard drive 1012 or communications interface 1024.

CONCLUSION

While various embodiment of the present invention have been described above, it should be understood that they have been presented by way of example only, and not limitation. Thus, the breadth and scope of the present invention should not be limited by any of the above-described exemplary embodiments and arrangements, but should be defined only in accordance with the following claims and their equivalents.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method of transferring data bytes from a first memory to a second memory, comprising the steps of:
    (a) storing a plurality of multiple-byte data words including a header field byte and a plurality of data field bytes in the first memory;
    (b) reading a first data word including the header field byte and one or more data field bytes out of the first memory;
    (c) transferring the one or more data field bytes to the second memory; and
    (d) storing only the one or more data field bytes in the second memory contiguously with a previously transferred and stored data field byte, wherein said reading step (b) comprises reading the first data word using a multitude-byte read data transfer operation.

2. The method of claim 1, wherein step (c) comprises the step of:
    (c)(i) writing the first data word to the second memory using a multiple-byte write transfer operation.

3. The method of claim 2, wherein step (c) further comprises the step of:
    (c)(ii) re-ordering the one or more data bytes in the first data word concurrent with said writing step (c)(i).

4. The method of claim 2, wherein step (c) further comprises the step of:
    (c)(ii) re-ordering the one or more data field bytes in the first data word such that a first one of the one or more data field bytes is stored contiguously with the stored data field byte of the previously transferred data field byte in said storing step (d).

5. The method of claim 4, further comprising the step of:
    (e) determining a byte offset between a word address of the first data word stored in the first memory and a byte address of a first one of the one or more data bytes in the first data word, wherein said re-ordering in step (c)(ii) is based on the byte offset determined at step (e).

6. The method of claim 1, further comprising the step of:
    (e) deriving an address pointer indicating a next available byte location contiguous with the previous byte location in the second memory, said storing step (d) comprising storing the first one of the one or more data field bytes in the second memory based on the address pointer.

7. The method of claim 1, wherein:
    each of the bytes in each of the multiple-byte data words stored in the first memory occupies a predetermined byte position in the data word;

the second memory includes multiple memory segments each corresponding to a respective one of the byte positions; and step (d) comprises storing the one or more of the data field bytes of the first data word in one or more corresponding ones of the multiple memory segments based on the byte positions occupied byte one or more bytes in the first data word.

8. The method of claim 1, further comprising the steps of:

(e) reading a middle data word including a plurality of data field bytes from the first memory;

(f) transferring the middle data word to the second memory; and (g) storing the plurality of data field bytes of the middle data word contiguously with each other and with the one or more data field bytes of the first data word in the second memory.

9. The method of claim 1, wherein:

each of the bytes in each of the multiple-byte data words stored in the first memory occupies a predetermined byte position in the data word;

the second memory includes multiple memory segments each corresponding to a respective one of the byte positions; and step (d) comprises storing the one or more data field bytes of the first data word and each of the plurality of data field bytes of the middle data word in corresponding ones of the multiple memory segments based on the byte positions occupied by the data field bytes in the first and middle data words.

10. The method of claim 1, further comprising the steps of:

(e) reading a last data word including a header field byte and one or more data field bytes out of the first memory;

(f) transferring the one or more data field bytes of the last data word to the second memory; and (g) storing only the one or more data field bytes of the last data word in the second memory contiguously with a previously transferred and stored data field byte.

11. The method of claim 10, further comprising the step of:

(h) determining a total number of the one or more data field bytes of the last data word to be stored in the second memory in step (g) based on a total number of data field bytes between the header field byte of the first data word and the header field byte of the second data word, and a byte offset in the first memory between a first one of the one or more data field bytes and a word address of the first data word.

12. The method of claim 1, further comprising the steps of:

(e) deriving an address pointer indicating a next available byte location in the second memory; and (f) deriving a write signal and applying the write signal to the second memory, wherein said storing step (d) comprises storing the one or more data field bytes in the second memory in response to the address pointer and the write signal.

13. The method of claim 1, the second memory including a plurality of memory segments each for storing a plurality of data field bytes, the method further comprising the steps of:

(e) deriving a plurality of separate address pointers each indicating a next available byte location in a corresponding one of the memory segments; and (f) deriving a plurality of separate write signals and applying each of the separate write signals to a corresponding one of the memory segments, wherein said storing step (d) comprises storing the one or more data bytes in one or more corresponding ones of the plurality of memory segments in response to the plurality of separate address pointers and write signals.

14. A system for transferring data bytes, comprising:

(a) a first memory for storing a plurality of multiple-byte data words including a header field byte and one or more data field bytes;

(b) a second memory for storing data field bytes;

(c) a controller coupled to the first and second memories for reading a data word including the header field byte and the one or more data field bytes out of the first memory; and (d) a data packer coupled to the controller and the second memory, the controller and data packer operating together to transfer the one or more data field bytes of the first data word read from the first memory to the second memory, the data packer storing only the one or more data field bytes in the second memory contigously with a previously transferred and stored data field byte, wherein the controller reads the first data word using a multiple-byte read data transfer.

15. The system of claim 14, wherein the controller writes the first data word to the data packer using a multiple-byte write data transfer.

16. The system of claim 15, wherein the data packer includes a data organizer that re-orders the one or more data bytes in the first data word concurrent with the controller writing the first data word to the byte packer.

17. The system of claim 15, wherein the data packer includes a data organizer that re-orders the one or more data field bytes in the data word such that a first one of the one or more data field bytes is stored contiguously with the stored data field byte of the previously transferred data field byte.

18. The system of claim 17, wherein the controller determines a byte offset between a word address of the first data word stored in the first memory and a byte address of a first one of the one or more data bytes in the first data word, the controller providing the byte offset to the data packer, the data packer re-ordering the one or more data field bytes based on the byte offset.

19. The system of claim 14, wherein the data packer includes a data packer controller that derives an address pointer indicating a next available byte location contiguous with the previous byte location in the second memory, the data packer controller storing the first one of the one or more data field bytes in the second memory based on the address pointer.

20. The system of claim 14, wherein:

each of the bytes in each of the multiple-byte data words stored in the first memory occupies a predetermined byte position in the data word;

the second memory includes multiple memory segments each corresponding to a respective one of the byte positions; and the data packer controller storing the one or more of the data field bytes of the first data word in one or more corresponding ones of the multiple memory segments based on the byte positions occupied by the one or more bytes in the first data word.

21. The system of claim 14, wherein:

the controller reads a middle data word including a plurality of data field bytes from the first memory;

the controller and data packer together transfer the plurality of data field bytes of the middle data word to the second memory; and the data packer stores the plurality of data field bytes of the middle data word contiguously with each other and with a previously transferred and stored data field byte in the second memory.

22. The system of claim 21, wherein:

each of the bytes in each of the multiple-byte data words stored in the first memory occupies a predetermined byte position in the data word;

the second memory includes multiple memory segments each corresponding to a respective one of the byte positions; and the data packer stores the one or more data field bytes of the first data word and each of the plurality of data field bytes of the middle data word in corresponding ones of the multiple memory segments based on the byte positions occupied by the data field bytes of the first and middle data words.

23. The system of claim 14, wherein:

the controller reads a last data word including a header field byte and one or more data field bytes out of the first memory;

the controller and the data packer together transfers the one or more data field bytes of the last data word to the second memory; and the controller stores only the one or more data field bytes of the last data word in the second memory contiguously with a previously transferred and stored data field byte.

24. The system of claim 23, wherein the data packer controller determines a total number of the one or more data field bytes of the last data word to be stored in the second memory based on a total number of data field bytes between the header field byte of the first data word and the header field byte of the second data word, and a byte offset in the first memory between a first one of the one or more data field bytes and a word address of the first data word.

25. The system of claim 14, wherein the data packer includes a data packer controller that derives an address pointer indicating a next available byte location at which to store a data field byte in the second memory, the data packer controller deriving a write signal, wherein the data packer stores the one or more data field bytes in the second memory using the address pointer and the write signal.

26. The system of claim 14, the second memory including a plurality of memory segments each storing a plurality of data field bytes, the data packer including a controller to:

derive a plurality of separate address pointers each indicating a next available byte location in a corresponding one of the memory segments; and derive a plurality of separate write signals and applying each of the separate write signals to a corresponding one of the memory segments, wherein the data packer stores the one or more data bytes in one or more corresponding ones of the plurality of memory segments in response to the plurality of separate address pointers and write signals.

* * * * *